(12) United States Patent  
Laury et al.

(10) Patent No.: US 10,467,581 B2  
(45) Date of Patent: Nov. 5, 2019

(54) DELIVERY MANAGEMENT SYSTEM

(71) Applicant: UDELV INC., Burlingame, CA (US)

(72) Inventors: Daniel Laury, Tiburon, CA (US); Akshat Patel, San Francisco, CA (US)

(73) Assignee: UDELV INC., Burlingame, CA (US)

( * ) Notice: Subject to any disclaimer, the term of this patent is extended or adjusted under 35 U.S.C. 154(b) by 183 days.

(21) Appl. No.: 15/875,639

(22) Filed: Jan. 19, 2018

(65) Prior Publication Data

US 2019/0228375 A1    Jul. 25, 2019

(51) Int. Cl.
| | |
|---|---|
| *G06Q 10/08* | (2012.01) |
| *G06Q 10/04* | (2012.01) |
| *G05D 1/00* | (2006.01) |
| *G01C 21/34* | (2006.01) |

(52) U.S. Cl.
CPC ....... *G06Q 10/0836* (2013.01); *G01C 21/343* (2013.01); *G05D 1/0088* (2013.01); *G06Q 10/047* (2013.01); *G06Q 10/0833* (2013.01)

(58) Field of Classification Search
CPC ........... G06Q 10/0836; G06Q 10/0833; G06Q 10/047; G01C 21/343; G05D 1/0088
USPC .......................................................... 701/25
See application file for complete search history.

(56) References Cited

U.S. PATENT DOCUMENTS

| | | | |
|---|---|---|---|
| 6,813,557 B2 | 11/2004 | Schmidt et al. | |
| 7,739,040 B2 | 6/2010 | Horvitz | |
| 7,778,773 B2 | 8/2010 | Fajardo et al. | |
| 7,975,798 B2 | 7/2011 | Lucas et al. | |
| 8,397,138 B2 | 3/2013 | Gardner | |
| 8,634,969 B2 | 1/2014 | Buelthoff et al. | |
| 8,706,394 B2 | 4/2014 | Lee et al. | |
| 9,258,390 B2 | 2/2016 | Riddoch et al. | |
| 9,275,549 B2 | 3/2016 | Ando | |
| 9,287,956 B2 | 3/2016 | Campos | |
| 9,300,430 B2 | 3/2016 | Matthew | |
| 9,428,183 B2 | 8/2016 | Foley et al. | |
| 9,494,439 B1 | 11/2016 | Ross et al. | |
| 9,507,346 B1 | 11/2016 | Levinson et al. | |

(Continued)

FOREIGN PATENT DOCUMENTS

| | | |
|---|---|---|
| EP | 1360618 A2 | 11/2003 |
| KR | 10-1456184 B1 | 11/2014 |

(Continued)

OTHER PUBLICATIONS

International Search Report and Written Opinion issued in PCT/US19/12266 and dated Apr. 29, 2019, 11 pages.

(Continued)

*Primary Examiner* — Muhammad Shafi  
(74) *Attorney, Agent, or Firm* — Perkins Coie LLP

(57) ABSTRACT

Systems and methods for delivering a requested payload using an autonomous delivery vehicle are described herein. An end-user can order a delivery of the requested payload, and a delivery management system can select a delivery region corresponding to the order. The delivery management system can further generate one or more delivery tasks and delivery routes corresponding to the tasks. The delivery management system can operate the autonomous delivery vehicle according to the tasks and the routes to pick up the requested payload from a pickup location and to transport the requested payload to a delivery location.

20 Claims, 7 Drawing Sheets

(56) References Cited

U.S. PATENT DOCUMENTS

| | | | |
|---|---|---|---|
| 9,560,692 B2 | 1/2017 | McGee et al. | |
| 9,586,525 B2 | 3/2017 | Sejalon et al. | |
| 9,688,288 B1 | 6/2017 | Lathrop | |
| 9,720,410 B2 | 8/2017 | Fairfield | |
| 9,720,411 B2 | 8/2017 | Crombez | |
| 9,964,948 B2 | 5/2018 | Ullrich | |
| 2008/0086269 A1 | 4/2008 | Joe et al. | |
| 2010/0121576 A1 | 5/2010 | Aso et al. | |
| 2013/0090802 A1 | 4/2013 | Curtis et al. | |
| 2014/0129135 A1 | 5/2014 | Holden et al. | |
| 2014/0303827 A1 | 10/2014 | Dolgov et al. | |
| 2014/0309833 A1* | 10/2014 | Ferguson | G05D 1/00 701/23 |
| 2014/0336935 A1 | 11/2014 | Zhu et al. | |
| 2015/0338226 A1* | 11/2015 | Mason | G01C 21/3605 701/408 |
| 2015/0352953 A1 | 12/2015 | Koravadi | |
| 2015/0359032 A1 | 12/2015 | Menard et al. | |
| 2016/0273922 A1 | 9/2016 | Stefan | |
| 2017/0123419 A1* | 5/2017 | Levinson | G01S 7/4972 |
| 2017/0124512 A1 | 5/2017 | Harvey | |
| 2017/0154347 A1* | 6/2017 | Bateman | G06Q 30/0202 |
| 2017/0308098 A1 | 10/2017 | Yu et al. | |
| 2017/0329330 A1 | 11/2017 | Hatano | |
| 2018/0005169 A1 | 1/2018 | High et al. | |
| 2018/0074487 A1 | 3/2018 | Song | |
| 2018/0158018 A1* | 6/2018 | Luckay | G06Q 10/0832 |
| 2018/0299898 A1 | 10/2018 | Luo | |
| 2019/0041852 A1* | 2/2019 | Schubert | G05D 1/0088 |
| 2019/0066041 A1* | 2/2019 | Hance | B65G 1/137 |
| 2019/0130349 A1* | 5/2019 | Ferguson | G06Q 10/08355 |

FOREIGN PATENT DOCUMENTS

| | | |
|---|---|---|
| KR | 10-20170077495 | 7/2017 |
| WO | 200915178 A1 | 12/2009 |

OTHER PUBLICATIONS

International Search Report and Written Opinion issued in PCT/US2018/043645 dated Nov. 14, 2018, 14 pages.

Udelv, Inc., "udelv Makes World's First Public Road Test Delivery From Its Autonomous Last-Mile Delivery Vehicle," PR Newswire from: https://www.prnewswire.com/news-releases/udelv-makes-worlds-first-public-road-test-delivery-from-its-autonomous-last-mile-delivery-vehicle-300590123.html, Jan. 30, 2018, 4 pp.

\* cited by examiner

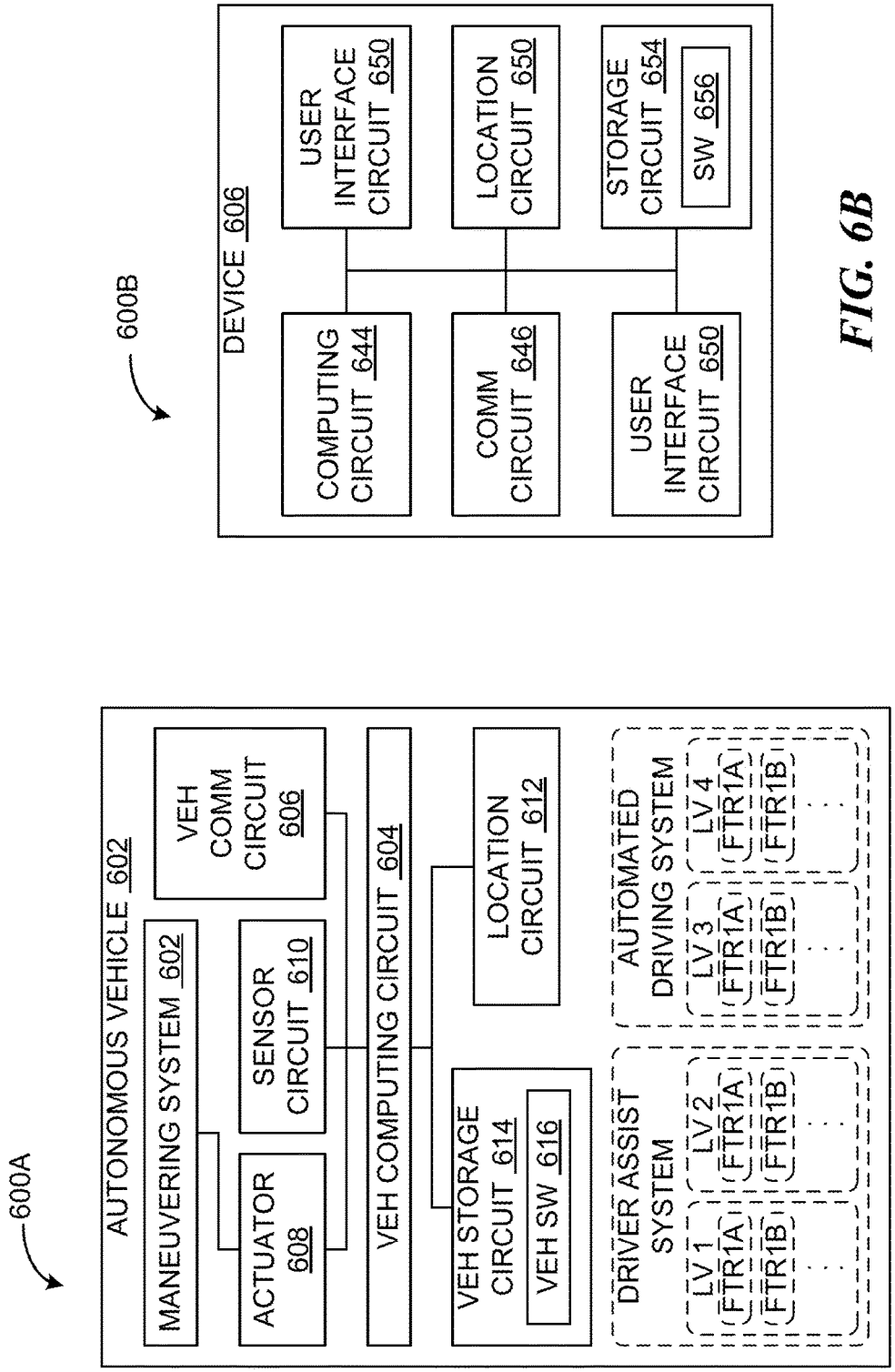

DELIVERY MANAGEMENT SYSTEM

APPLICATION(S) INCORPORATED BY REFERENCE

U.S. patent application Ser. No. 15/673,601, titled "MULTI-STAGE OPERATION OF AUTONOMOUS VEHICLES," and filed on Aug. 10, 2017, is incorporated herein by reference in its entirety.

BACKGROUND

With the rapid growth of e-commerce, a pressing need to fulfil on-demand and high volume delivery has emerged. Local businesses require a competitive solution to address neighborhood deliveries that are frequent, timely and secure. With rising demand, the logistics industry is faced with increasing transportation bandwidth needs in an industry and operational structure that is already fragmented. While autonomous vehicles may be able to help alleviate many of these challenges, deploying autonomous vehicles as delivery agents has presented a new set of challenges related to system integration, resource deployment/management, etc.

BRIEF DESCRIPTION OF THE DRAWINGS

FIG. 6A and FIG. 6B are block diagrams illustrating components of a delivery management system according to some embodiments.

DETAILED DESCRIPTION

Figure 1:
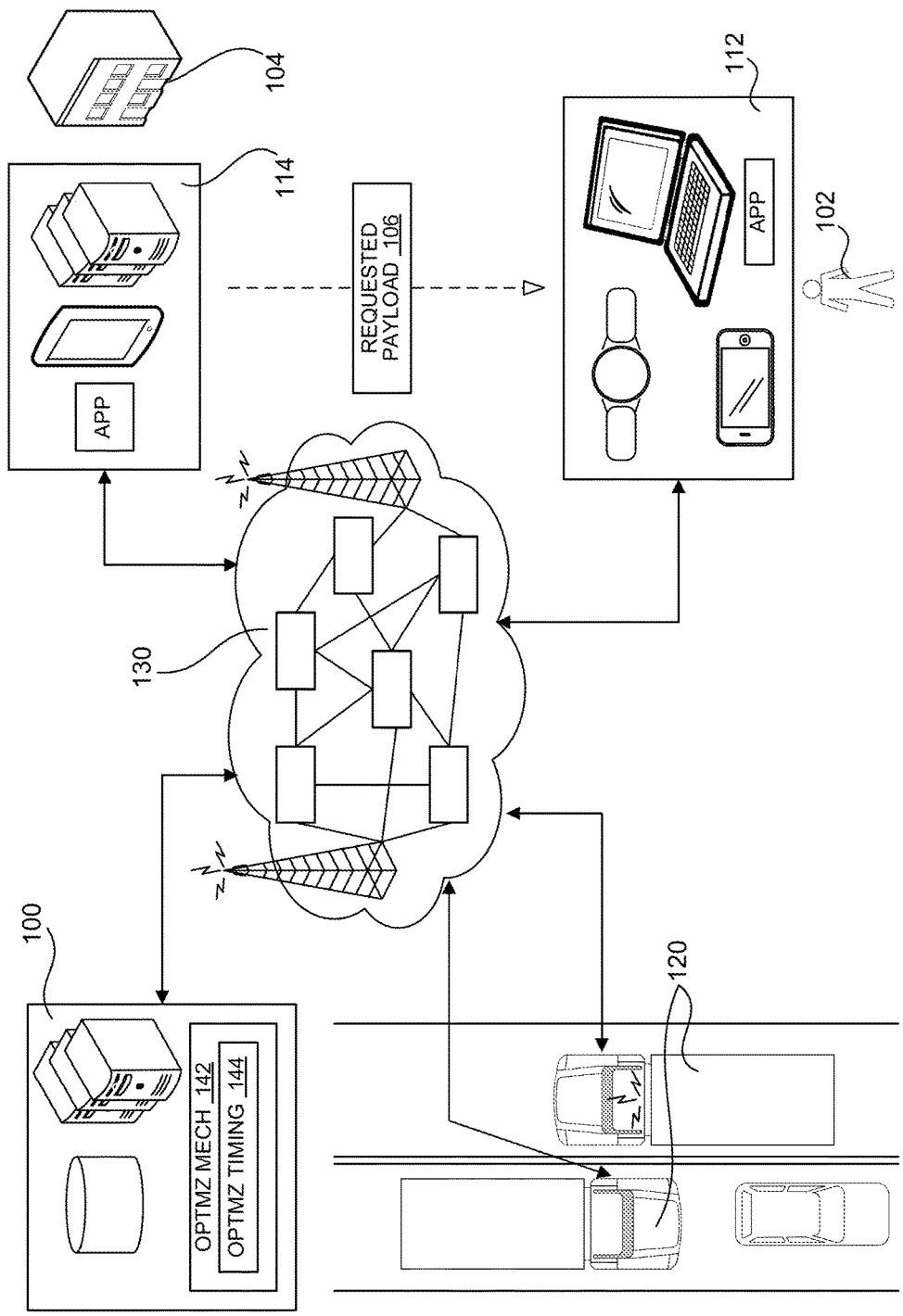
FIG. 1 is a schematic diagram of an example environment in which a system for managing deliveries may operate according to some embodiments.

The following disclosure describes various embodiments of systems and methods for managing a fleet of autonomous delivery vehicles to deliver payloads to delivery recipients (e.g., end users). In some embodiments, when the delivery recipient orders items/products (e.g., over the phone or the Internet) from a merchant/provider, a delivery management system can operate an autonomous delivery vehicle to deliver the ordered items/products to the delivery recipient. In operating the autonomous delivery vehicle, the delivery management system can generate a delivery route for the autonomous delivery vehicle to traverse. The delivery route can include one or more pickup locations for loading the ordered items/products onto the autonomous delivery vehicle, and a delivery location where the delivery recipient can pickup or otherwise obtain the ordered items/products. The delivery management system can coordinate operation of multiple autonomous delivery vehicles, pick up from or loading at multiple loading locations, delivery to multiple recipients, or a combination thereof.

In some embodiments, the delivery management system can coordinate operations based on delivery regions that each correspond to one or more autonomous vehicles at a given time. In some embodiments, the delivery management system can determine the delivery regions (e.g., non-overlapping or partially-overlapping representations of geographical regions/areas) by dividing geographical regions/areas into smaller segments/regions/areas to facilitate the delivery operation/management. In some embodiments, the delivery regions can be generated based on linear and/or non-linear optimization mechanisms, one or more search mechanisms (e.g., RRTs, A*, D*, etc.), machine learning mechanisms (e.g., DNNs, decision trees, etc.), or a combination thereof.

The delivery management system can assign and direct the one or more autonomous vehicles to each of the delivery regions. In some embodiments, the delivery management system can assign and direct the autonomous vehicles in real-time based on a demand forecast for likely upcoming delivery missions.

The delivery management system can further facilitate interactions (e.g., with the merchant/provider, a system or a device thereof) for loading the ordered items/products onto the autonomous vehicles. In some embodiments, the delivery management system can determine a loading profile for assigning specific items/products to specific cargo space on a vehicle (e.g., based on the intended delivery recipient/sequence). For example, the delivery management system can determine the loading profile so that access to only one cargo space can be loaded/opened at a time, and/or to allow access to the next cargo space when the previously opened space has been loaded/closed and/or when the loaded cargo has been verified, such as based on scanning/recognizing an assigned code, product bar code, product image/shape, etc. In some embodiments, the delivery management system can communicate the loading profile to the merchant user or to a device at the loading location (e.g., for physically arranging/grouping the ordered products, for facilitating use of automated loading devices at the merchant user side, etc.).

The delivery management system can also facilitate interactions (e.g., with the recipient user, the merchant/provider, a system or a device thereof, or a combination thereof) for providing access to the ordered items/products by the intended delivery recipient. In some embodiments, the delivery management system can calculate a pickup location within a threshold distance/area relative to a recipient location for providing safe access to the ordered item/product on the autonomous delivery vehicle for the delivery recipient. In some embodiments, the delivery management system can communicate a notification to the intended delivery recipient when the autonomous delivery vehicle is within a time and/or distance threshold from the pickup location and/or at the pickup location. In some embodiments, the delivery management system can provide secured access to the ordered item/product based on, e.g., identifying physical markers of the delivery recipient, confirming access information/unique code provided by the delivery recipient, etc.

Suitable Environments

FIG. 1 and the following discussion provide a brief, general description of a suitable environment in which a delivery management system according to some embodiments may be implemented. Although not required, aspects of the invention are described in the general context of computer-executable instructions, such as routines executed by a general-purpose computer, a personal computer, a server, or other computing system. The invention can also be embodied in a special purpose computer or data processor that is specifically programmed, configured, or constructed to perform one or more of the computer-executable instructions explained in detail herein. Indeed, the terms "computer" and "computing device," as used generally herein, refer to devices that have a processor and non-transitory memory, like any of the above devices, as well as any data processor or any device capable of communicating with a network. Data processors include programmable general-purpose or special-purpose microprocessors, programmable controllers, application-specific integrated circuits (ASICs), programming logic devices (PLDs), graphics processing units (GPUs), or the like, or a combination of such devices. Computer-executable instructions may be stored in memory, such as random access memory (RAM), read-only memory (ROM), flash memory, or the like, or a combination of such components. Computer-executable instructions may also be stored in one or more storage devices such as magnetic or optical-based disks, flash memory devices, or any other type of non-volatile storage medium or non-transitory medium for data. Computer-executable instructions may include one or more program modules, which include routines, programs, objects, components, data structures, and so on that perform particular tasks or implement particular abstract data types.

Aspects of the invention can also be practiced in distributed computing environments, where tasks or modules are performed by remote processing devices linked through a communications network including, but not limited to, a Local Area Network (LAN), Wide Area Network (WAN), or the Internet. In a distributed computing environment, program modules or subroutines may be located in both local and remote memory storage devices. Aspects of the invention described herein may be stored or distributed on tangible, non-transitory computer-readable media, including magnetic and optically readable and removable computer discs, or stored in firmware in chips (e.g., EEPROM chips). Alternatively, aspects of the invention may be distributed electronically over the Internet or over other networks (including wireless networks). Those skilled in the relevant art will recognize that portions of the invention may reside on a server computer while corresponding portions reside on a client computer.

Referring to FIG. 1, a delivery management system 100 (e.g., one or more computing devices, such as servers, in which aspects of the described technology may operate) can connect a delivery recipient 102 (e.g., an end-user ordering items/products online or over the phone) with a merchant user 104 (e.g., an entity providing or selling the ordered items/products, such as a store or a restaurant). For example, the delivery recipient 102 can order one or more requested payloads 106 from the merchant user 104.

The delivery management system 100 can connect to and/or communicate with a user device 112 (e.g., a computing device, such as a smart phone, a smart watch, a personal computer, etc.) of the delivery recipient 102, a merchant interface mechanism 114 (e.g., a computing device, such as a server, a handheld device, etc.) of the merchant user 104, or a combination thereof. In some embodiments, the delivery management system 100 can receive a request to pick up and deliver the requested payload 106 from the user device 112 and/or the merchant interface mechanism 114. In some embodiments, the delivery management system 100 can be within the merchant interface mechanism 114 (e.g., at the merchant-side instead of at an external party/service provider) and be coupled to or integral with the ordering mechanism.

The delivery management system 100 can manage operations of a fleet of autonomous delivery vehicles 120 for transporting ordered items to corresponding recipients. The autonomous delivery vehicles 120 can each be a vehicle capable of operating (i.e., including maneuvering and/or traversing the vehicle through physical space and/or controlling functions, components, or subsystems of the vehicle) according to and through its surrounding environment. Such vehicles include, for example, automobiles and trucks with capabilities according to Society of Automotive Engineers (SAE) defined Level 3 or above. To manage the fleet, the delivery management system 100 can allocate/move the autonomous delivery vehicles 120 to specific geographic regions (by, e.g., controlling geographic locations of the autonomous delivery vehicles 120), generate delivery routes including one or more pickup locations and one or more delivery locations (e.g., locations corresponding to one or more intended recipients), control the autonomous delivery vehicles 120 to traverse the delivery routes, coordinate loading processes at the pickup locations, provide secure access to the ordered items by the corresponding delivery recipient 102 at the pickup location, or a combination thereof.

For example, the delivery management system 100 can generate a delivery mission (e.g., a computer task for providing physical access to the requested payload 106 by the delivery recipient 102) based on the order and/or requested delivery for the requested payload 106. The delivery management system 100 can generate the delivery mission for each order, each recipient, each pickup location, or a combination thereof. In some embodiments, the delivery management system can generate the delivery mission for each order, with the delivery mission including tasks for picking up the ordered items from one or more pickup locations and for providing the secured access at the pickup location.

The delivery management system 100 can generate the delivery route including the pickup locations and/or the delivery locations, and assign/move one of the autonomous delivery vehicles 120 (from, e.g., the vehicles allocated to a specific geographic zone, such as the zone that includes the pickup location, the delivery location, or a combination thereof) to traverse the delivery route. In some embodiments, the delivery management system 100 can combine multiple delivery missions (e.g., multiple orders for the same recipient or for multiple recipients) and generate one delivery route that covers the combined set of delivery missions.

For example, the delivery management system 100 can generate the delivery route, assign/move one of the autonomous delivery vehicles 120, combine the delivery missions, or a combination thereof based on an optimization mechanism 142 (e.g., a mechanism for optimizing a delivery time, a travel distance, etc.). The optimization mechanism 142 can include hardware and/or software components configured to implement a linear/non-linear optimization algorithm, a machine-learning algorithm, a predictive algorithm, a pattern-recognition algorithm, or a combination thereof. In performing the various functions, the optimization mechanism 142 can consider various factors, such as vehicle availability, available storage in vehicles, a predetermined wait-time, a demand forecast, vehicle fuel/battery status, payload concerns (e.g., cold/hot prioritization), etc.

In some embodiments, the optimization mechanism 142 can include an optimization timing 144. The optimization timing 144 can include a limitation or a requirement for implementing or initiating the optimization mechanism 142. For example, the optimization timing 144 can include a wait duration, a frequency, an analysis level/complexity/duration, or a combination thereof used to initiate or control implementation of the optimization mechanism 142. The delivery management system 100 can run or execute the optimization mechanism 142 according to a timing or a frequency specified by the optimization timing 144.

The delivery management system 100, the user device 112, and/or the merchant interface mechanism 114 can be connected to each other through a network 130 (e.g., the communication network). The network 130 can include a wired and/or wireless network for communicating or exchanging data. For example, the network 130 can include local area networks (LAN), wide area networks (WAN), wireless fidelity (WiFi) network, cellular network (e.g., fourth generation (4G) Long Term Evolution (LTE), fifth generation (5G) communication network, or other networks), fiber optic networks, cellular network, satellite network, telephone network, the Internet, or a combination thereof. The network 130 can further include communication devices, such as access points, routers, servers, switches, repeaters, base stations, etc., that facilitate the communication between end-point devices (e.g., the delivery management system 100, the user device 112, and/or the merchant interface mechanism 114). In some embodiments, the network 130 can include mechanisms for device-to-device communication, such as according to Bluetooth, Near-Field Communication (NFC), Dedicated Short-Range Communications (DSRC), etc.

Discussion of Various Aspects of the Autonomous-Delivery Management System

Figure 2:
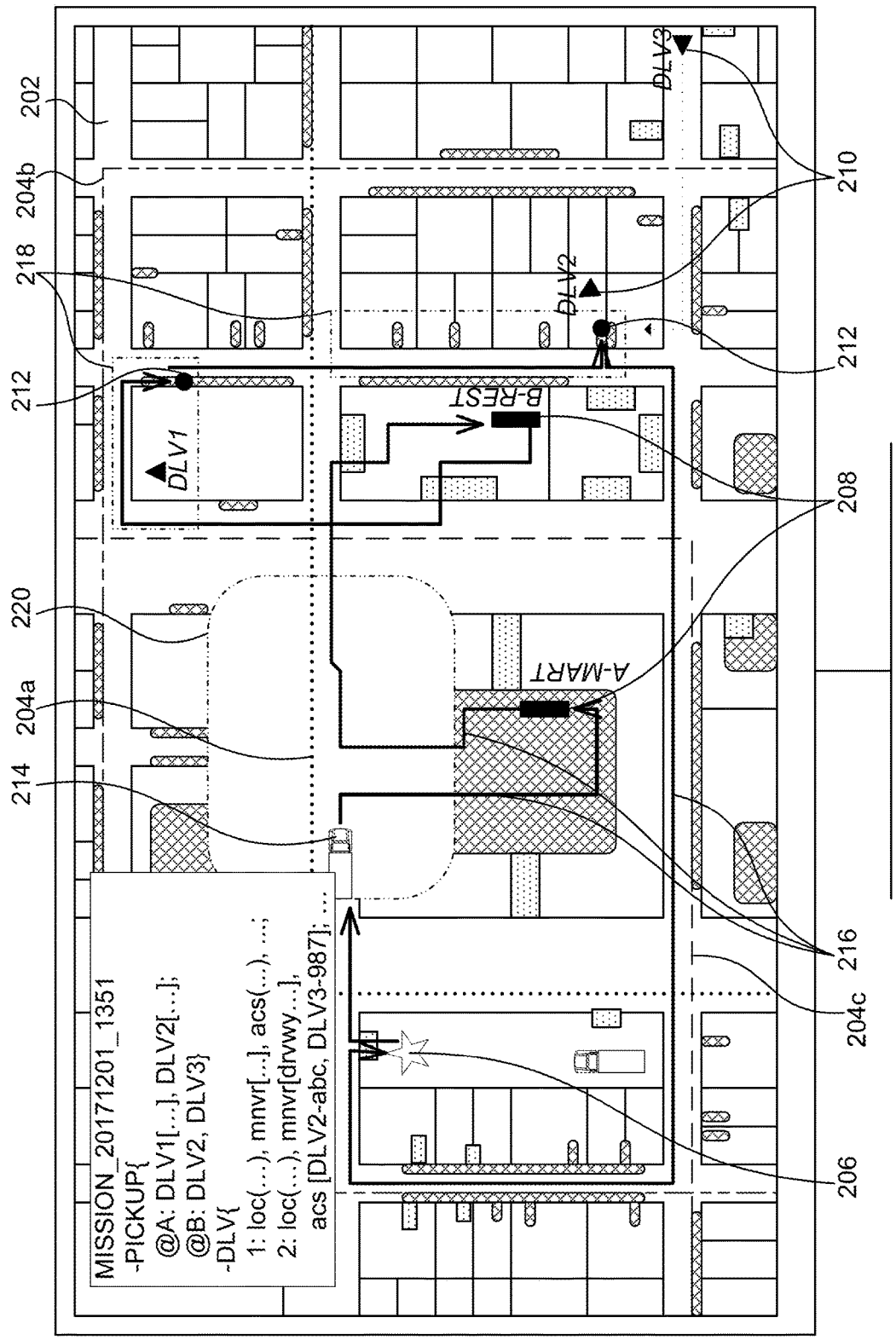
FIG. 2 is an example display for a vehicle operation system according to some embodiments.

FIG. 2 is an example display of a vehicle operation system according to some embodiments. The display can show a map 202 representing a geographic region. Referring to FIG. 1 and FIG. 2 together, the delivery management system 100 can determine and/or utilize a plurality of delivery regions 204 (identified individually as delivery regions 204a-204c) that cover the geographic region to manage the delivery of the requested payload 106 using the autonomous delivery vehicles 120. The delivery regions 204 can at least partially overlap (e.g., as illustrated in FIG. 2) and/or be entirely separate (not shown). In some embodiments, the different delivery regions 204 can correspond to different types/categories/instances of vehicle, deliverable goods, service levels, etc.

In some embodiments, the delivery management system 100 can determine the delivery regions 204 by calculating boundaries for the delivery regions 204. For example, the delivery management system 100 can calculate the boundaries using linear and/or non-linear optimization, one or more search mechanisms (e.g., RRTs, A*, D*, etc.), and/or machine learning mechanisms (e.g., DNNs, decision trees etc.). The delivery management system 100 can calculate the boundaries using historical data, demand patterns of a given region or a customer (e.g., the merchant user 104, the delivery recipient 102, etc.) associated with one or more geographic locations, geographical features (e.g., vehicle paths, natural geographical features such as hills or bodies of water, etc.), traffic flow characteristics (e.g., travel speeds, available stop or pull-over locations, path types/categories, travel limitations, etc.), or a combination thereof. In calculating the boundaries, the delivery management system 100 can further use the number of the autonomous delivery vehicles 120 available for deployment.

The delivery regions 204 can include one or more resting locations 206, one or more pickup locations 208, or a combination thereof. The resting locations 206 can correspond to geographic locations and/or facilities designated for refueling the autonomous delivery vehicles 120 (by, e.g., refilling gasoline or recharging electrical batteries) and/or designated for storing or parking the autonomous delivery vehicles 120 between delivery missions. The pickup locations 208 can correspond to the merchant user 104. The pickup locations 208 can include geographic locations and/or facilities where products or items can be accessed (e.g., stores, distribution centers, loading zones, etc.). In some embodiments, the delivery management system 100 can calculate the boundaries based on the resting locations 206, the pickup locations 208, or a combination thereof (e.g., based on their coordinates, their sizes/capacities/popularity, etc.).

In some embodiments, the delivery regions 204 can be predetermined or pre-mapped before implementing the management operations. In implementing the management operations, the delivery management system 100 can assign each of the autonomous delivery vehicles 120 to one of the delivery regions 204 at a given time. The delivery management system 100 can use the assigned autonomous vehicles to perform the delivery missions within the assigned delivery region.

When the delivery recipient 102 orders or requests the payload 106, the delivery management system 100 can generate a delivery mission for transporting and delivering the requested payload 106. In generating the delivery mission, the delivery management system 100 can determine a recipient location 210 (e.g., a geographic location associated with the delivery recipient 102). For example, the recipient location 210 can be determined based on locating the user device 112 (by, e.g., using the Global Positioning System (GPS) coordinates of the user device 112) and/or based on a recipient address provided by the delivery recipient 102 as a part of the order/request.

Based on the recipient location 210, the delivery management system 100 can determine one or more delivery locations 212, each location representing where the delivery recipient 102 can access the autonomous delivery vehicle and the requested payload 106 therein. The delivery management system 100 can determine each of the delivery locations 212 as one of the stop locations (e.g., a predetermined geographical location where a vehicle can stop without interrupting the flow of traffic, where a person can approach and access the vehicle, such as a shoulder, a drive way, a parking lot or spot, etc.) closest to the recipient location 210. In some embodiments, the delivery management system 100 can determine each the delivery locations 212 as a location designated by the corresponding delivery recipient 102 (e.g., a preferred location pre-identified by the delivery recipient 102 or identified at the time of the order/request).

In some embodiments, the delivery management system 100 can determine the delivery locations 212 as GPS coordinates corresponding to the delivery address provided with the order, such as by the delivery recipient 102 during the ordering process. As the delivery vehicle approaches the delivery locations 212, such as when the delivery vehicle is within a threshold distance/range from the delivery locations 212 or when the vehicle passes a specified location, the delivery vehicle can autonomously determine a stopping location based on real-time information (e.g., sensor information) representing a current situation/condition surrounding the vehicle, on the road, traffic condition, etc. The delivery vehicle can stop at the determined stop location to allow the delivery recipient 102 to access the requested payload 106. The delivery vehicle can further communicate the stop location to the delivery management system 100 for performing the next task/mission.

In processing the delivery mission, the delivery management system 100 can select one of the autonomous delivery vehicles 120 to carry out the delivery mission. The delivery management system 100 can select a vehicle based on a vehicle current location 214 relative to the pickup location corresponding to the requested payload 106. For example, the delivery management system 100 can select the autonomous delivery vehicle that is closest to the pickup location. The delivery management system 100 can further select a vehicle based on a status of the vehicle, such as the remaining amount of fuel or available travel range/distance, the status or existence of any missions tasked to the vehicle (e.g., whether the vehicle has finished a task or has a timing-critical mission remaining), the available cargo space, etc.

Based on the delivery locations 212 and the vehicle selection, the delivery management system 100 can calculate a delivery route 216 for the delivery mission. The delivery management system 100 can calculate the delivery route 216 including the pickup location 208 and/or one or more of the delivery locations 212 of the requested payload 106. The delivery management system 100 can calculate the delivery route 216 starting from the vehicle current location 214 or a resting location corresponding to the selected vehicle (e.g., a location for re-tasking the vehicle once the vehicle returns to its base, such as for refueling/recharging). The delivery management system 100 can include the pickup location 208 and/or the corresponding delivery location as a route destination. In some embodiments, the delivery route 216 can include the pickup location as an intermediate stop in the delivery route 216 preceding the corresponding delivery location. In some embodiments, the delivery management system 100 can calculate the delivery route 216 within one delivery region or across a limited number of adjacent delivery regions.

For example, the delivery management system 100 can determine a list of delivery tasks (e.g., a pickup task or a drop off task for a delivery mission) that are outstanding or have not been completed. The delivery management system 100 can use the optimization mechanism 142 to calculate a sequence for the outstanding tasks. Based on the sequence, the delivery management system 100 can use a location (e.g., the pickup location or the delivery location) that corresponds to the next task in the sequence as the destination. For the starting point, the delivery management system 100 can use the vehicle's current location or vehicle's reported stop location. Based on the starting point and the destination point the delivery management system 100 can calculate the delivery route 216 according to one or more mechanisms, such as A* algorithm, Dijkstra's algorithm, Floyd-Warshall's algorithm, optimization algorithms, etc.

In some embodiments, the delivery management system 100 can use the one or more mechanisms to calculate the route that minimizes or maximizes a cost, a condition, or a resource (e.g., a distance, travel time, fuel/electrical charge, travel speed, etc.) associated with traversing from the starting point to the destination point. The delivery management system 100 can also consider real-time road conditions, in calculating the delivery route 216. For example, the delivery management system 100 can use the route calculation mechanism to generate a set of potential routes that go from the starting point to the destination point. The delivery management system 100 can calculate a score for each of the routes based on the cost, the condition, or the resource needed to travel the route. The delivery management system 100 can further increase or decrease the score based on the real-time conditions of the road segments in the corresponding route. In some embodiments, the delivery management system 100 can consider real-time conditions that include current or historical traffic conditions (e.g., traffic flow, reported accidents on the same road and/or within a threshold distance from one or more points on a potential route), weather conditions, black-out areas (e.g., construction zones or intersections with high rate of traffic accidents), etc. After scoring the potential routes, the delivery management system 100 can calculate the delivery route 216 as the route that has the highest/lowest score within the generated set.

Along with the route, the delivery management system 100 can generate other information/requirements/instructions for the delivery mission. For example, the delivery management system 100 can generate access information (e.g., storage location of the requested payload 106 within the vehicle, a unique code or key for accessing the storage location, etc.), vehicle maneuver information (e.g., user permission to access private property such as driveway, maneuvering instructions specific to locations and/or stops on the route), contact information (e.g., for the merchant user 104 and/or the delivery recipient 102), loading information, or a combination thereof.

The delivery management system 100 can operate and control the autonomous delivery vehicles 120 to complete or implement the delivery tasks. For example, the delivery management system 100 can communicate the delivery mission and/or the delivery route 216 to the vehicle selected for the mission. The autonomous vehicle can use a self-operating mechanism (e.g., a mechanism that does not require a human operator or a driver therein) or an assisted operation mechanism (e.g., a mechanism that requires limited assistance from a remote human operator to address certain deficiencies in the self-operating mechanism) to traverse the delivery route 216. In some embodiments, the delivery management system 100 can include the self-operating mechanism or a portion thereof that controls the selected vehicle to traverse the delivery route 216.

The delivery management system 100 can also communicate other information to the merchant interface mechanism 114 (e.g., such as loading information, access information, etc.), the autonomous vehicle 120 (e.g., such as vehicle maneuver information, access information, etc.), the delivery recipient 102 (e.g., such access information, a request or verification for private property access, etc.), or a combination thereof. For example, the delivery management system 100 can communicate instructions to the selected vehicle 120, or enable pre-loaded instructions, for the loading operation at the pickup location. The instructions can include stopping at the pickup location until the loading operation is done, turning off certain sub-systems to preserve energy, opening one storage space at a time for loading one order or a set of orders for a given recipient, or a combination thereof.

In carrying out or implementing the delivery mission, the selected vehicle 120 can operate according to the delivery management system 100 and traverse the delivery route 216. The selected vehicle 120 can stop at the pickup location (e.g., based on a vehicle-determined stop location) and execute the instructions to load the requested payload 106. Once the loading operation finishes (e.g., as cued by the merchant user 104 or the merchant interface mechanism 114), the selected vehicle can traverse the remainder of the delivery route 216 to the corresponding delivery location or other locations.

The delivery management system 100 can track the vehicle current location 214 as the vehicle carries out the delivery mission and/or traverses the delivery route 216. The delivery management system 100 can also implement and/or update the delivery mission based on the vehicle current location 214. For example, the delivery management system 100 can send a message to the user device 112 to notify the delivery recipient 102 when the vehicle current location 214 reaches or crosses a messaging threshold 218 (e.g., a distance, such as n miles/feet, or a landmark, such as m blocks/intersections, away from the corresponding delivery location) relative to one or more of the delivery locations 212. Accordingly, the delivery management system 100 and/or the vehicle can notify the delivery recipient 102 of the estimated time of arrival and/or the actual arrival, access code or key for retrieving the requested payload 106 from the selected vehicle, etc.

The delivery management system 100 can assign multiple delivery missions to one vehicle. The delivery management system 100 can group multiple delivery missions on one delivery route for picking up items from multiple locations, delivering to multiple locations, or a combination thereof (e.g., including one or more pickup locations and/or including one or more delivery locations). The delivery management system 100 can group the delivery missions using the optimization mechanism 142 that uses a variety of factors as input parameters. For example, the optimization mechanism 142 can generate multiple potential groupings of the tasks/missions for analysis/evaluation according to predetermined rules/processes of the mechanism. The mechanism can use one or more predetermined equations/processes to calculate a score or a cost for each of the potential groupings. The score/cost can be calculated according to input parameters such as anticipated/projected upcoming demand, vehicle current locations, remaining amount of fuel or the available travel range/distance of the vehicles, the time-requirements of remaining delivery missions, a delivery time of one or more vehicles, a travel distance for one or more vehicles, etc. The delivery management system 100 can select one of the analyzed groupings having the highest or the lowest calculated score/cost as the optimal or targeted grouping of the tasks/missions intended for implementation using one of the delivery vehicles.

The delivery management system 100 can group the delivery missions according to the optimization timing 144 (e.g., at predetermined time intervals/frequency). For example, the delivery management system 100 can group orders made within a duration between implementations of the optimization mechanism 142. Also, the delivery management system 100 can group delivery missions generated before the vehicle returns to its resting location, before it is fully charged, etc.

In some embodiments, the delivery management system 100 can group delivery missions and then generate the delivery route 216 for accommodating the group of missions. In some embodiments, the delivery management system 100 can update or adjust the delivery route 216 to include or accommodate further delivery mission(s). The delivery management system 100 can assign further delivery missions to the selected vehicle and update or adjust the delivery route 216 accordingly (e.g., in real-time while the vehicle is in transit on the existing/previous delivery route) based on a variety of factors. For example, the delivery management system 100 can assign the delivery mission and update the delivery route 216 based on remaining amount of fuel/charge or the available travel range/distance of the selected vehicle, time-requirements of remaining delivery missions (e.g., delivery promise time, condition of the payload, etc.), or a combination thereof.

As another example, the delivery management system 100 can add a new delivery mission or adjust the delivery mission while the vehicle is in transit based on a distance, a travel time, a cost, or a combination thereof associated with the new delivery mission. The delivery management system 100 can use a route adjustment threshold 220 to add the delivery mission while the vehicle is in transit. The delivery management system 100 can add the delivery mission when the distance, the travel time, the cost, or a combination thereof is below or within the route adjustment threshold 220. As an illustrative example, the delivery management system 100 can add the delivery mission when a distance from its pickup location and/or its delivery location to the vehicle current location 214, upcoming or remaining portions of the existing/previous delivery route, or a combination thereof is within the route adjustment threshold 220.

In some embodiments, the delivery management system 100 can determine, maintain, and update delivery mission assignments, sequence, etc. for one or more autonomous delivery vehicles 120. For each vehicle, the delivery management system 100 can determine the next mission that the vehicle should execute and send the necessary information to the vehicle, such as a target location (e.g., the pickup location 208 and/or the delivery locations 212), associated instructions (e.g., specific maneuver information, physical access permission, loading/unloading instructions, etc.), the delivery route 216 to the target location, or a combination thereof. Accordingly, as the delivery vehicle enters a specific zone surrounding or near the delivery locations 212, the delivery vehicle can autonomously determine the stopping location as discussed above and pull-over/stop within the specified zone. Once the vehicle determines that the task is complete (e.g., based on sensing that the requested payload 106 is loaded onto or picked up from the vehicle), the vehicle can communicate the stopping location and status to the delivery management system 100. The delivery management system 100 can use the stopping location to calculate a new route (e.g., a new instance of the delivery route 216 from the stopping location to the next pick location and/or delivery location) for the subsequent delivery mission assigned to the vehicle.

Figure 3:
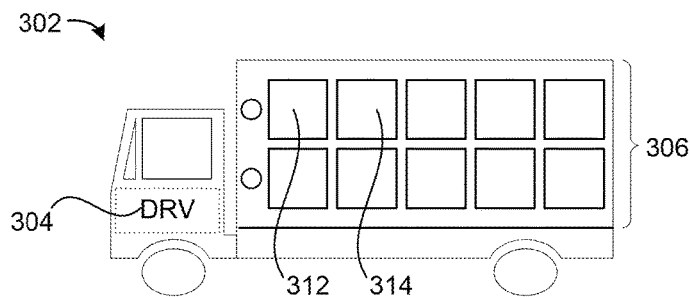
FIG. 3 is a side view of an automated delivery vehicle according to some embodiments.

FIG. 3 is a side view of an autonomous delivery vehicle 302 according to some embodiments. The autonomous delivery vehicle 302 (e.g., an automobile or a truck including a chassis, drive-by-wire systems, sensors, computers, etc. with capabilities rated as SAE Level 3 or above) can include an autonomous maneuvering system 304 for autonomously traveling from one location to another. For example, the autonomous maneuvering system 304 can include actuators, sensors, computing components (e.g., processors, memory, etc.), communication components, software components (e.g., self-driving algorithm, delivery/pickup user interface, etc.), or a combination thereof.

The autonomous maneuvering system 304 can operate according to the delivery route 216 of FIG. 2 to cause the autonomous delivery vehicle 302 to traverse the delivery route 216. The autonomous maneuvering system 304 can further operate the autonomous delivery vehicle 302 according to loading/delivery instructions (e.g., maneuver information associated with a corresponding location, wait periods or task completion conditions at the location, etc.).

The autonomous delivery vehicle 302 can further include a cargo system 306 for carrying one or more instances of the requested payload 106 of FIG. 1. The cargo system 306 can include one or more enclosed spaces, such as a first compartment 312 and a second compartment 314, configured to carry the one or more instances of the requested payload 106. The cargo system 306 (e.g., a robotic vending system) can include one or more accessing mechanisms configured to control or limit access to the inner portions of the corresponding compartment (e.g., lockers or compartments with locks, identification/interface component, etc.), one or more sensors (e.g., a weight sensor, a door position sensor, a light-based sensor, etc.) configured to detect a presence/absence or a status/trait of the cargo within the corresponding compartment. For example, the cargo system 306 can include actuators, sensors, micro-controllers to operate individual cargo space doors or operate automated robotic dispensing or loading. Also for example, the cargo system 306 can further include a user interface such as indicative animations to draw customers towards a certain side of the vehicle or certain region of the cargo area. Also for example, the user interface can detect user's physical traits or receiving user inputs for identifying the delivery recipient or other persons accessing the compartments.

As an illustrative example, referring to FIG. 1 and FIG. 3 together, the delivery management system 100 can receive information associated with a plurality of delivery orders. The delivery management system 100 can then assign the delivery orders for each individual delivery recipient 102 to a separate compartment in the cargo system 306. The delivery management system 100 can send information associated with the assignment to the merchant interface mechanism 114.

When the autonomous delivery vehicle 302 arrives at the pickup location 208 of FIG. 2, the cargo system 306 can open the designated compartments one at a time in accordance with the loading instructions/sequence communicated to the merchant interface mechanism 114. The cargo system 306 can verify that the assigned payload is loaded in the correct compartment (such as based on information received through a verification device in the compartment and/or based on interacting with the merchant interface mechanism 114 associated with the loading process) and that the compartment is closed/locked. When the correct payload is in the assigned compartment (e.g., the first compartment 312) and the compartment door is closed/locked, the cargo system 306 can open the next compartment (e.g., the second compartment 314) in accordance with the loading instructions.

Similarly, when the autonomous delivery vehicle 302 arrives at the delivery locations 212, the cargo system 306 can interact with the delivery recipient 102 and/or the user device 112 of FIG. 1 to allow access to the requested payload 106. For example, the cargo system 306 can verify that the delivery recipient 102 corresponding to each of the delivery locations 212 is present through the interaction. When the cargo system 306 verifies the correct delivery recipient, the cargo system 306 can allow access to the corresponding compartment/requested payload, such as by opening/unlocking the door or cover to the corresponding compartment.

In some embodiments, the delivery management system 100 can send (such as before the vehicle arrives at the delivery locations 212) an access key (e.g., an alpha-numeric code, a transmittable signal pattern, a displayable image, etc.) to the delivery recipient 102 and/or the user device 112 for the verification process. The cargo system 306 can receive the access key from the delivery recipient 102 and/or the user device 112 and validate the access key for the verification process. In some embodiments, the cargo system 306 can interact with the user device 112, such as by communicating with an application on the user device 112 that has been verified (e.g., using a software access key, such as a software token or code).

Timing Associated with an Autonomous-Delivery Management System

Figure 4A:
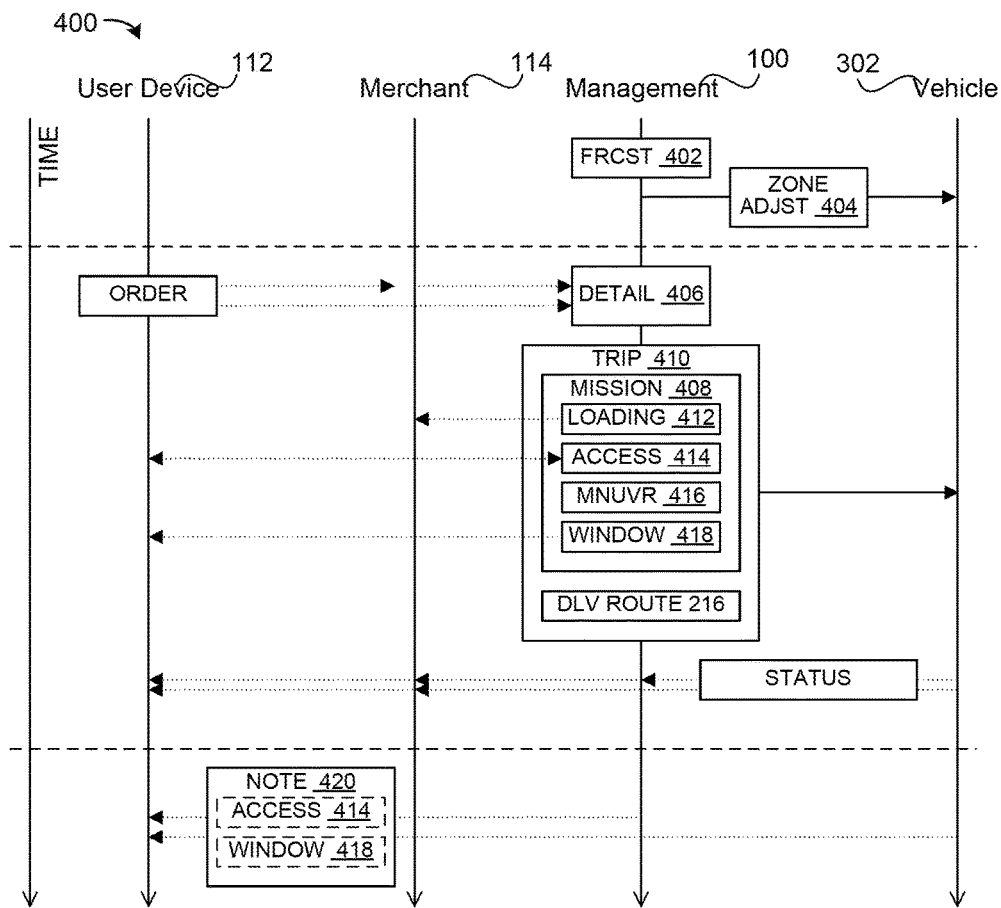
FIG. 4A and FIG. 4B are timing diagrams illustrating example interactions between devices according to some embodiments.
Figure 4B:
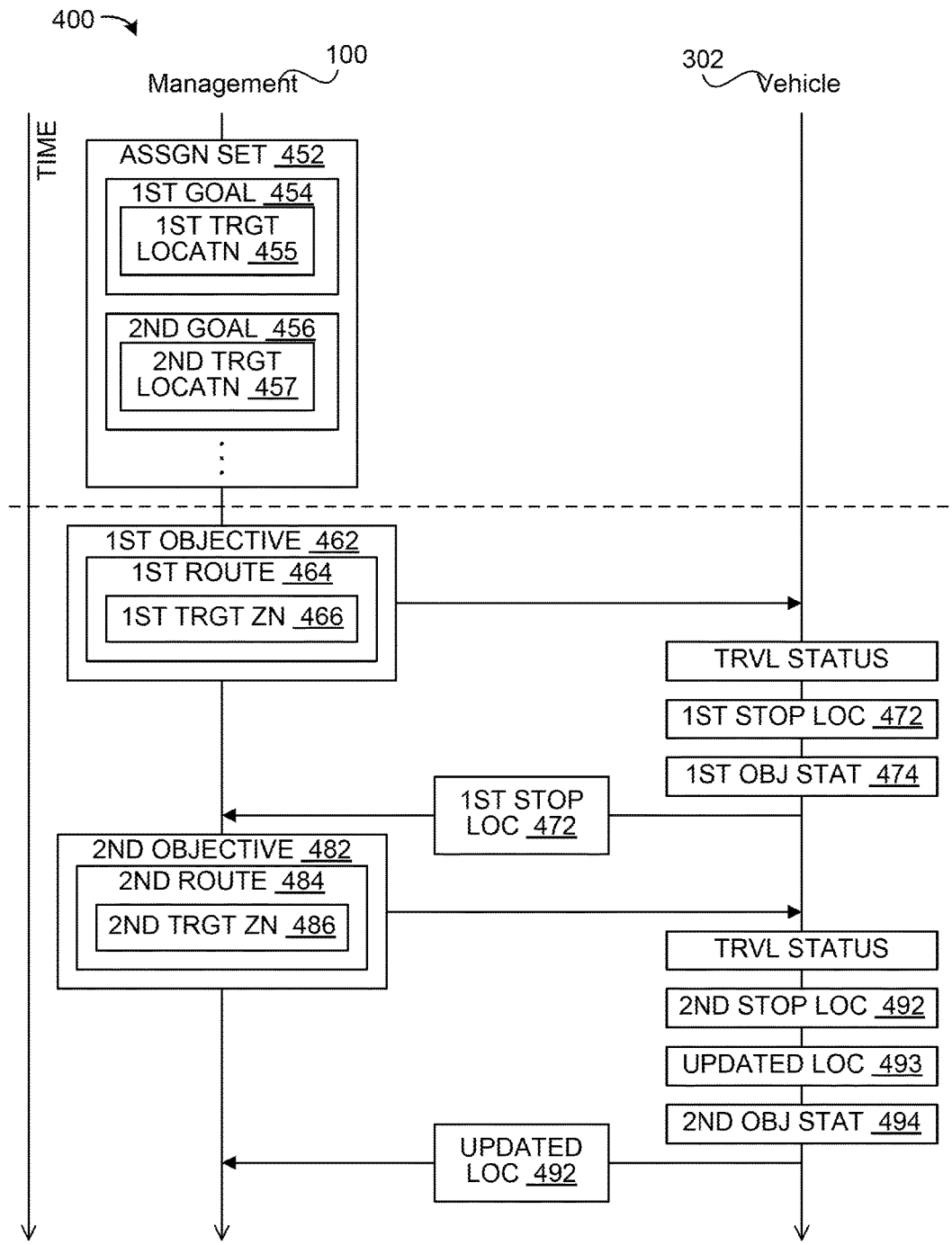

FIG. 4A and FIG. 4B are timing diagrams illustrating example interactions between devices according to some embodiments. FIG. 4A is a timing diagram illustrating an example interaction 400 between devices for an overall operation of the delivery management system 100. For example, referring to FIGS. 1-4A together, when the autonomous delivery vehicle 302 is at rest (such as when the vehicle is without an outstanding delivery task, fully charged, located at the resting location, empty of cargo, etc.), the delivery management system 100 can calculate a demand forecast 402 (e.g., an estimate of an upcoming amount of orders or an amount of resources likely necessary for the upcoming amount of orders) for one or more delivery regions 204 including the region associated with the vehicle. The delivery management system 100 can calculate the demand forecast 402 based on analyzing historical data (e.g., previous order information), current ongoing demands in other areas previously determined to be analogous to the analyzed area (e.g., in other similar metropolitan areas, different time zones, etc.), or a combination thereof.

When certain conditions are satisfied (e.g., when a projected demand for the vehicle's assigned region is below a threshold, when a projected demand for a different region is above a threshold, or a combination thereof), the delivery management system 100 can communicate a zone-assignment adjustment 404 (e.g., a command or information for reassigning the vehicle to a different region and/or relocating the vehicle to the different region) to the autonomous delivery vehicle 302 to satisfy the demand forecast 402 of a targeted region. Accordingly, the delivery management system 100 can assign the autonomous delivery vehicle 302 to the targeted region instead of the previous region to meet or accommodate the demand forecast 402. Further, the autonomous delivery vehicle 302 can travel from the previous region and/or the vehicle current location 214 to a different location within the targeted region (e.g., the resting location assigned to the vehicle). The autonomous delivery vehicle 302 can send information (not shown) back to the delivery management system 100 to update the status of the autonomous delivery vehicle 302, such as by sending current available range or remaining amount of fuel, the vehicle current location 214, status of the cargo system 306 (e.g., loaded cargo, such as for cross-region deliveries, available compartments, etc.).

Separately, the example interaction 400 can include device instructions for delivering the requested payload 106 in response to an order. For example, when the delivery recipient 102 orders or requests the payload 106, the delivery management system 100 can receive an order detail 406 from the merchant interface mechanism 114, the user device 112, etc. The order detail 406 can include information corresponding to the order, such as identification of the delivery recipient 102 and/or the user device 112, the delivery locations 212 (represented as, e.g., an address or a location provided during the order or a location corresponding thereto, such as a parking location predetermined by the system or GPS coordinates), a permission to access private property (e.g., for entering driveways, parking lots, etc.), identification of the requested payload 106 and/or the merchant user 104 (e.g., a specific provider, such as a store/restaurant or a location thereof), special accessibility options during payload 106 retrieval (such as based on end-user recipient requests including disabilities or physical constraints), etc.

Based on the order detail 406, the delivery management system 100 can generate a delivery mission 408 (e.g., machine-readable data/instructions) for picking up and/or transporting the requested payload 106 to the corresponding delivery location using one of the autonomous delivery vehicles 120. The delivery management system 100 can use one or more predetermined processes or templates to identify tasks associated with the delivery mission 408. The tasks can include machine-readable data/instructions for picking up (e.g., loading or providing loading access) and/or dropping off (e.g., unloading or providing retrieval access) items, traveling to associated locations (e.g., loading/unloading locations), functions to be performed at the associated locations, etc. The delivery management system 100 can generate the delivery mission 408 as one or more tasks or a sequence of tasks associated with a common item and/or a common location.

In generating the delivery mission 408, the delivery management system 100 and/or the autonomous vehicle 120 can determine an appropriate pickup location (e.g., one or more of the pickup locations 208) for the requested payload 106. In some embodiments, the delivery management system 100 can determine the pickup location based on accessing a database that includes potential providers and/or locations that provide/receive various different items. The delivery management system 100 can select the pickup/delivery location (e.g., merchant location) that is located in the same region as the end-user location or is closest to each other.

In some embodiments, the delivery management system 100 can determine the pickup location based on receiving the location information from the user device 112, such as for dropping off user-provided items, or from the merchant interface mechanism 114 that forwarded the user's requests to receive items. Based on the appropriate pickup and locations, the delivery management system 100 can select an appropriate set of delivery regions 204. For example, the delivery management system 100 can select the set of regions 204 that includes both the appropriate pickup location and the corresponding delivery location.

Once the delivery regions are identified for the mission, the delivery management system 100 can further select one of the autonomous delivery vehicles 120 for accomplishing or carrying out the delivery mission 408 according to the selected region(s) 204. For example, the delivery management system 100 can select the autonomous delivery vehicle 302 that is assigned to the selected region, nearest to the pickup location, or a combination thereof.

In some embodiments, the delivery management system 100 can combine multiple delivery missions. For example, the delivery management system 100 can combine delivery missions that have common delivery locations or delivery locations within a threshold distance, common recipient, common pickup locations, or a combination thereof. Also for example, the delivery management system 100 can combine delivery missions based on a characteristic (e.g., a change in distance/resource cost/time, a weight or a score associated with the route, a minimum delivery requirement, etc.) of a potential route that connects the delivery locations, the pickup locations, or a combination thereof for the set of delivery missions.

The delivery management system 100 can generate a vehicle trip detail 410 for the selected autonomous delivery vehicle. The vehicle trip detail 410 can include a set of the delivery missions intended or configured to be implemented with the selected vehicle in one continuous trip or based on traversing one continuous route. Accordingly, the delivery management system 100 can generate the delivery route 216 that includes one or more pickup locations 208, one or more delivery locations 212, or a combination thereof for the set of delivery missions. For example, the delivery management system 100 can generate the vehicle trip detail 410 using the optimization mechanism 142 to group the delivery missions. The delivery management system 100 can generate the vehicle trip detail 410 as a set/sequence of assignments of the delivery missions for specific vehicles from a set possible assignment combinations. The optimization mechanism 142 can be used to calculate a score/cost for each of the possible assignment combination using one or more predetermined equations/processes. The optimization mechanism 142 can calculate the score/cost based on a variety of factors associated with each of the combination, such as a route distance/time, an expected fuel/energy used for the deliveries, projections of upcoming/potential orders, status of available delivery vehicles, etc.

In some embodiments, the delivery management system 100 can further determine a loading profile 412, a receiver-access profile 414, a maneuver detail 416, a pickup window 418, or a combination thereof for the vehicle trip detail 410 and/or the delivery mission 408. The loading profile 412 can include information associated with loading the requested payload 106 onto the cargo system 306 at the corresponding pickup location.

In some embodiments, the delivery management system 100 can determine the loading profile 412 based on accessing various data associated with deliverable items, potential locations associated with delivery, etc. For example, the delivery management system 100 can access a database that includes predetermined time requirements, dimensions, shape, weight, etc. for potentially deliverable items to determine physical descriptions of the ordered item. Also, the delivery management system 100 can access a database that includes potential and/or previously accessed pickup/delivery locations for each region that matches the ordered item and/or the identified delivery location. The database can further include instructions/maneuvers that correspond to the various stored locations, data/instructions for interfacing with one or more devices (e.g., the merchant device or the user device) associated with the various locations, etc. In some embodiments, the delivery management system 100 can receive the data associated with deliverable items, potential locations associated with delivery, etc. from another device (e.g., the user device 112, the merchant interface mechanism 114, other networked device, etc.).

Based on accessing the data/instructions, the delivery management system 100 can determine the loading profile 412 based on selecting a compartment that satisfies the size or preservation (e.g., temperature and/or time) requirement of the requested payload 106. In some embodiments, the delivery management system 100 can generate a list of machine-readable instructions and/or checkpoints (e.g., scans or queries verifying that correct load has been placed in the open compartment) for each item and/or compartments. The instructions and/or the check points can correspond to the loading sequence. Based on the determined loading profile 412, the cargo system 306 (e.g., the robotic vending system) and/or the merchant device can automatically open/close compartments, load (e.g., physically move and place) items, sort loaded items, and/or verify items.

In some embodiments, an end-user loading the item can assign or pick the lockers/compartments. The cargo system 306 can associate the loaded item with the assigned compartment and the delivery recipient. Based on the association, the cargo system 306 can use identification of the delivery recipient to open the correct compartment and provide access to the item designated for the recipient.

Also based on accessing the data/instructions, the delivery management system 100 can determine the receiver-access profile 414 as information associated with providing the requested payload 106 to the delivery recipient 102 (e.g., unloading) at the corresponding delivery location. In some embodiments, the receiver-access profile 414 can include previously-provided permission and/or preferences from the delivery recipient 102 or a property owner associated with the delivery location. In some embodiments, the receiver-access profile 414 can include registration information (e.g., telephone number, address, etc.) associated with or provided by the delivery recipient 102, the corresponding delivery location, or a combination thereof. The delivery management system 100 can separately determine the receiver-access profile 414 based on identifying a relationship/connection between the assigned compartment and the user device 112 and/or based on generating an access code/key used for accessing/opening the assigned compartment.

For the maneuver detail 416, the delivery management system 100 can use the access permission, designated locations/coordinates, corresponding maneuver instructions, etc. that correspond to the location of the task. In some embodiments, the maneuver detail 416 can include information (e.g., machine-readable instructions) intended for specifically maneuvering the vehicle at one or more portions (e.g., specific locations, such as specific instances of the resting locations 206, the pickup locations 208, the delivery locations 212, etc.) along the delivery route 216. For example, the maneuver detail 416 can be used for pulling up to a specific loading zone at the corresponding pickup location, for positioning the vehicle at a charging location or a fuel pump at the corresponding resting location, for maneuvering into a specific parking lot or a private driveway, etc. In some embodiments, the maneuver detail 416 can include a user-provided permission to access private property and/or coordinates of the permitted location. Accordingly, the vehicle can use the access information to determine a stop location, such as be considering the permitted location first before searching for other potential stop locations, and autonomously determine and perform maneuvers for stopping at the determined location.

For the pickup window 418 (e.g., a time duration associated with the delivery locations 212), the delivery management system 100 can use an amount of time it took to access the items on previous deliveries. For example, the pickup window 418 can include a wait time for the autonomous delivery vehicle 302 at the delivery locations 212 for allowing the delivery recipient 102 to access the requested payload 106 from the cargo system 306. In some embodiments, the delivery management system 100 and/or the autonomous delivery vehicle can calculate or adjust the pickup window 418 after the vehicle determines a stop location. The delivery management system 100 and/or the autonomous delivery vehicle can calculate a potential walking route between the determined stop location and the originally requested delivery location. The pickup window 418 can be calculated/adjusted according to one or more predetermined equations/processes. Inputs for the one or more equations/processes can include characteristics/traits of the potential walking route, such as a distance between the stop location and the delivery location, a geographical relationship between the two locations (e.g., across streets, separate blocks, etc.), a traffic restriction (e.g., a cross-walk, a construction zone, etc.), etc. In some embodiments, the recipient 102 can communicate a request for extending the delivery window to the delivery management system 100 and/or autonomous delivery vehicle 302 through user device 112.

The delivery management system 100 can communicate the vehicle trip detail 410, the delivery mission 408, and the delivery route 216 to the selected vehicle (e.g., the autonomous delivery vehicle 302). In some embodiments, the delivery management system 100 can further communicate the loading profile 412 to the merchant user 104 and/or the merchant interface mechanism 114, communicate the receiver-access profile 414 to the delivery recipient 102 and/or the user device 112, and communicate the pickup window 418 or a description thereof to the delivery recipient 102 and/or the user device 112.

The selected vehicle can begin and traverse the delivery route 216 based on the vehicle trip detail 410. The selected vehicle can traverse a portion of the delivery route 216 (starting from the vehicle's location at the time of assignment) and travel to the pickup location (e.g., the first pickup location in the route) for loading the corresponding ordered items. The selected vehicle can further maneuver according to the maneuver detail 416 (e.g., maneuvering command for pulling up to a specific loading dock or parking spot, specifically locating or orienting the vehicle for loading, etc.) in approaching or at the pickup location. At the pickup location, the cargo system 306 can open one compartment at a time for loading one ordered item or one set of items intended for one delivery recipient. In some embodiments, the cargo system 306 can require the merchant user 104 or the merchant interface mechanism 114 to provide the loading profile 412 or a portion thereof (e.g., the access code/key assigned to the merchant user 104 for loading the corresponding item) for opening the corresponding compartment(s) for loading. In some embodiments, the cargo system 306 can interact with the merchant interface mechanism 114 to verify the requested payload 106 assigned to a compartment (while loading the payload or once the payload is loaded into the compartment), to automatically load items, or a combination thereof.

The selected vehicle can traverse the delivery route 216 after loading the requested payload 106. In some embodiments, the vehicle can send status updates to the delivery management system 100, the user device 112, or a combination thereof. For example, the vehicle can send real-time updates of the vehicle current location 214 as it traverses the delivery route 216. In some embodiments, the vehicle and/or the delivery management system 100 can send (e.g., directly from the vehicle, or directly from the delivery management system 100 based on information from the vehicle) a receiver notification 420 to the user device 112 when the vehicle current location 214 is at or within the messaging threshold 218 associated with the corresponding delivery location. The receiver notification 420 can notify the delivery recipient 102 regarding information regarding delivery and/or access of the requested payload 106, such as the vehicle's arrival, estimated time of arrival, current location, access instructions, remaining wait time, or a combination thereof. In some embodiments, the receiver notification 420 can include the receiver-access profile 414 (e.g., access code/key assigned to the delivery recipient 102 for accessing/opening the compartment), representation of the pickup window 418, details/representation of the delivery location, or a combination thereof.

When the selected vehicle arrives at the corresponding delivery location after traversing the delivery route 216, the selected vehicle can maneuver according to the maneuver detail 416 in approaching or at the corresponding delivery location. For example, the maneuver detail 416 can include instructions for pulling up to a specific location on the road or a specific parking spot, specifically locating or orienting the vehicle for access, pulling into a specific driveway, etc.

To complete the delivery, the vehicle can wait at the delivery locations 212 for at least the duration specified by the pickup window 418 or a shortened wait time, such as when the recipient completes the access before the end of the pickup window 418. The cargo system 306 can further interact with the delivery recipient 102 and/or the user device 112 to verify the user's identity (by, e.g., receiving and validating the access key/code assigned to the delivery recipient 102, identifying physical markers stored in the receiver-access profile, etc.) before opening or providing access to the assigned/corresponding compartment. The cargo system 306 can further verify that the loaded item is removed and/or that the compartment is closed to determine completion of the specific delivery mission.

In some embodiments, the vehicle can repeat the travel to and activities at other pickup locations and/or other delivery locations according to multiple combined missions in the vehicle trip detail 410. In some embodiments, the vehicle can include automated instructions to return to the assigned resting location upon completion of the vehicle trip detail 410 or missions therein. In some embodiments, the delivery management system 100 can generate the vehicle trip detail 410 including the route portion (e.g., the final portion of the delivery route 216), maneuvers, mission, or a combination thereof for returning the vehicle to the corresponding rest location.

In some embodiments, the delivery management system 100 and/or the autonomous delivery vehicle 302 can update or adjust the vehicle trip detail 410 and/or the delivery route 216 while the autonomous delivery vehicle 302 is in transit and/or carrying out the delivery missions. For example, the delivery management system 100 can receive a further order and identify the details of the order as discussed above. The delivery management system 100 can evaluate whether to wait until the vehicle returns to assign the order to the vehicle, assign the order to another vehicle, or update the existing trip detail and the route. The delivery management system can evaluate based on calculating a cost (e.g., a cost in time/distance/fuel or energy, a delay to remaining missions, an efficiency score, a remaining range/fuel or energy, or a combination thereof) according to the vehicle's current location or progress level. When the cost justifies updating an ongoing vehicle trip (such as when potential changes to the route satisfies one or more cost thresholds), the delivery management system 100 and/or the autonomous delivery vehicle 302 can adjust the vehicle trip detail 410 and the delivery route 216 to include the new mission.

FIG. 4B is a timing diagram illustrating an example interaction 450 between devices (e.g., the delivery management system 100 and the autonomous delivery vehicle 302) for implementing multiple tasks/delivery missions. Referring to FIGS. 1-3 and FIG. 4B together, in some embodiments, the delivery management system 100 can determine and manage an assignment set 452 including a sequence of multiple delivery missions (e.g., instances of the delivery mission 408) and/or associated tasks that are assigned to one or more of the autonomous delivery vehicles 120. The tasks associated with the missions can include travelling to a pick up location and/or a delivery location, performing associated functions (e.g., loading/unloading operation) as discussed above.

The delivery management system 100 can group and/or sequence the missions/tasks using the optimization mechanism 142 of FIG. 1 as discussed above. For example, the delivery management system 100 can use the optimization mechanism 142 to generate a set of different combinations/groupings/sequences of remaining tasks. The optimization mechanism 142 can further calculate routes that correspond to the combinations/groupings/sequences of the tasks and characteristics/traits associated with the routes (e.g., a route distance, a travel time, a resource/energy estimated for traversing the route, etc.). The optimization mechanism 142 can be used to calculate a cost score for each of the combinations/groupings/sequences using one or more predetermined equations/processes that factor in the characteristics/traits of the associated route along with available resources, such as location of delivery vehicles and their statuses (e.g., remaining fuel or available travel distance, remaining cargo space, requirements for remaining cargo, etc.).

In some embodiments, the delivery management system 100 can communicate to the autonomous delivery vehicle 302 one task/mission at a time along with any associated route, instructions/details (e.g., the loading profile 412, the receiver-access profile 414, the maneuver detail 416, the pickup window 418, etc.), or a combination thereof. The delivery management system 100 can communicate one task/mission at a time instead of communicating the entire group/sequence of the tasks/missions (e.g., the vehicle trip detail 410) at the same time. When the autonomous delivery vehicle 302 completes the assigned mission/task, the delivery management system 100 can communicate the next subsequent task/mission (such as, e.g., in accordance with the sequence).

For example, the delivery management system 100 can generate the assignment set 452 that includes at least a first goal 454 corresponding to a first target location 455 and a second goal 456 corresponding to a second target location 457. In some embodiments, the first goal 454 and the second goal 456 can represent separate delivery missions with the first target location 455 and the second target location 457 representing pickup and/or delivery locations corresponding to each of the delivery missions. In some embodiments, the first goal 454 and the second goal 456 can represent separate tasks (e.g., to pick up an ordered item or to drop off the ordered item) associated with one mission or different missions. The first target location 455 and the second target location 457 can represent the pickup and/or delivery locations associated with the tasks.

Once the goals are sequenced (e.g., according to the optimization mechanism 142 and/or the optimization timing 144 of FIG. 1 as discussed above), the delivery management system 100 can communicate to the assigned autonomous delivery vehicle a first objective 462 (e.g., computer-readable instructions) that represents the first goal 454. For the first objective 462, the delivery management system 100 can calculate a first route 464 (e.g., an instance of the delivery route 216 for traversing to the first target location 455 from the vehicle current location 214). In some embodiments, the first route 464 can include a first target zone 466 representing one or more areas within a threshold distance from the first target location 455. The first target zone 466 can represent a set of GPS coordinates where the autonomous delivery vehicle 302 is allowed to stop such that the delivery recipient 102 can access/pick up the requested payload 106 from the autonomous delivery vehicle 302. In some embodiments, the autonomous delivery vehicle 302 can determine the first target zone 466 based on the first route 464, such as based on a preset rule/threshold/distance/etc. relative to a destination or end-point of the first route 464.

Once the first objective 462 and/or the first route 464 is communicated to the autonomous delivery vehicle 302, the vehicle can traverse the first route 464. The vehicle can generate and/or communicate a travel status (e.g., the vehicle current location, traffic conditions, cargo bay conditions or sensor readings, etc.) to the delivery management system 100. When the autonomous delivery vehicle 302 reaches or enters the first target zone 466, the vehicle can autonomously calculate a first stop location 472 based on real-time information (e.g., vehicle sensor information, traffic information, road conditions, recipient location, etc.) associated with the environment surrounding the vehicle. For example, the autonomous delivery vehicle 302 can use the autonomous maneuvering system 304 or a separate mechanism/system to calculate the stop location. The autonomous delivery vehicle 302 can calculate the stop location as a location (e.g., a GPS coordinate) that removes the vehicle from the flow of traffic or reduces the vehicle's impact to the traffic flow, satisfies safety/access conditions associated with people approaching/accessing the vehicle to pick up and/or load the payload, etc.

Allowing the autonomous delivery vehicle 302 to autonomously calculate the stop location within the target zone near the delivery location allows the overall system to accommodate unpredictable conditions associated with real-world driving situations. The autonomous delivery vehicle 302 can use its capacity (e.g., software, artificial intelligence, etc.) to calculate an appropriate stop location that is near (e.g., within a threshold distance from) the requested delivery location. In some embodiments, factors and/or algorithms used to calculate the stop location can be similar to factors and/or algorithms used for emergency or non-emergency pull-overs/stops, vehicle parking, etc. For example, the autonomous delivery vehicle 302 can identify a set of potential stopping locations (e.g., locations along or outside of vehicle travel paths that satisfy a size/space requirement) upcoming on the route, such as based on camera images, received traffic condition information, map information, etc. The autonomous delivery vehicle 302 can evaluate and score the potential stopping locations using one or more predetermined processes. The autonomous delivery vehicle 302 can calculate the score according to a variety of real-time factors, such as total size/space available at the location, a calculated human accessibility of the location (e.g., potential walking routes, distance from vehicle travel paths, etc.) whether it blocks any vehicle paths, potential impact of required maneuvers on flow of traffic, an estimated time delay associated with stopping/resuming from the location, etc. The autonomous delivery vehicle 302 can select the stop location as the location corresponding to the highest/lowest score and/or the location that satisfies one or more of the requirements/factor thresholds.

In some embodiments, the delivery recipients can provide feedbacks, either positive or negative, regarding the stop location to the delivery management system 100. The delivery management system 100 can update a parameter and/or an algorithm in the autonomous delivery vehicle 302, adjust the target locations, etc. according to the feedbacks. Accordingly, on subsequent delivery missions for delivery locations at or within a threshold distance/structure (e.g., same city block), the delivery vehicles can determine the stop location according to the feedbacks, such as at the previous stop location if users provided positive feedbacks or at a different/suggested location if the users provided negative feedbacks or suggestions.

The autonomous delivery vehicle 302 can stop at the calculated stop location and wait for completion of the corresponding activity, such as for the requested payload 106 to be loaded at the pickup location and/or for the requested payload 106 to be removed from the cargo system 306 of FIG. 3 (e.g., from the assigned compartment) by the delivery recipient 102. The autonomous delivery vehicle 302 can determine a first objective status 474 based on the data (e.g., the loading profile 412 and/or the receiver-access profile 416) representing the activity to be performed at the location. For example, the autonomous delivery vehicle 302 can generate the first objective status 474 (that represents, e.g., completion of the loading/pickup activity) based on sensor readings from the cargo system 306, information from the interface unit, etc. In some embodiments, the sensor readings can include door lock status and/or weight/object sensor within compartments. In some embodiments, the information from the interface unit can include information from the merchant user 104 and/or the merchant interface mechanism 114 loading the item, and/or from the delivery recipient 102 and/or the user device 112.

Based on the first objective status 474 (e.g., when the activity corresponding to the first objective 462 is complete), the autonomous delivery vehicle 302 can communicate the first stop location 472 to the delivery management system 100. After receiving the first stop location 472, the delivery management system 100 can communicate a second objective 462 (e.g., similar to the first objective 462, but representing the second goal 456 instead of the first goal 454) to the vehicle. The delivery management system 100 can calculate a second route 484 (e.g. an instance of the delivery route 216 for traversing to the second target location 457) based on using the first stop location 472 as a starting location. Similar to the first route 464, the second route 484 can include a second target zone 486 representing one or more areas within a threshold distance from the second target location 457. In some embodiments, the vehicle can determine the target zone as discussed above.

Allowing the autonomous delivery vehicle 302 to determine/update the stop location within the target zone near the corresponding delivery location and to send the stop location, and calculating the delivery route 216 at the delivery management system 100 based on the received stop location can provide increased efficiency in operating the autonomous delivery vehicle 302. Setting the delivery locations 212 as the final stopping points may fail to consider real-time situations and conditions on the road that may prohibit the vehicle from stopping at the final stopping points. Further, maintaining the delivery locations 212 while the vehicle selects the appropriate stop locations can cause the vehicle to perform unnecessary maneuvers to reach the delivery locations 212 before starting the next mission/task. As such, having the vehicle uses real-time sensor information to select the stop point within a threshold distance from the delivery location, communicating the stop location, and using the delivery management system 100 to calculate the route for the next mission/task from the stop location can account for the real-time conditions while eliminating unnecessary maneuvers.

The interactions between the delivery management system 100 and the autonomous delivery vehicle 302 after communicating the second objective 482 can be similar to the interactions following the communication of the first objective 462. For example, the autonomous delivery vehicle 302 can calculate a second stop location 492 within the second target zone 486 and stop the vehicle there for accomplishing the activity (e.g., loading and/or unloading). The autonomous delivery vehicle 302 can communicate the second stop location 492 to the delivery management system 100 if a second objective status 494 indicates that the activity corresponding to the second objective 482 is complete.

In some embodiments, the autonomous delivery vehicle 302 can adjust the stop location, such as according to recipient request, change in traffic conditions or vehicle's surround environment, or a combination thereof. For example, the autonomous delivery vehicle 302 can continually analyze the environment sensor readings and/or incoming communications from the delivery management system 100, a traffic controller, other vehicles, etc. while stopped at the stop location. The autonomous delivery vehicle 302 can calculate an updated location 493 for certain conditions/situation, such as for a threshold-breaching traffic delay near and/or caused by the vehicle stop, newly available stop location with better rating/condition/score, request from the recipient to change the stop location and/or the delivery window, or a combination thereof. When the vehicle updates the stop location that corresponds to the second objective status 494 (e.g., activity completion), the vehicle can communicate to the delivery management system 100 the updated location 493.

For illustrative purposes, the delivery management system 100 is described as calculating the routes and/or the zones. However, it is understood that the devices can interact differently. For example, the delivery management system 100 can communicate to the delivery vehicle 302 the target location (e.g., first target location 455 or the second target location 457), and upon receipt, the autonomous delivery vehicle 302 can calculate the routes (e.g., the first route 464 or the second route 484), the target zones (e.g., the first target zone 466 or the second target zone 486), or a combination thereof. Also, the delivery management system 100 can communicate and/or update the assignment set 452 to the autonomous delivery vehicle 302. The autonomous delivery vehicle 302 can generate and traverse one route at a time, and only generate the next route when the previous task/mission is complete.

Flows for a Logistics Operations System

Figure 5A:
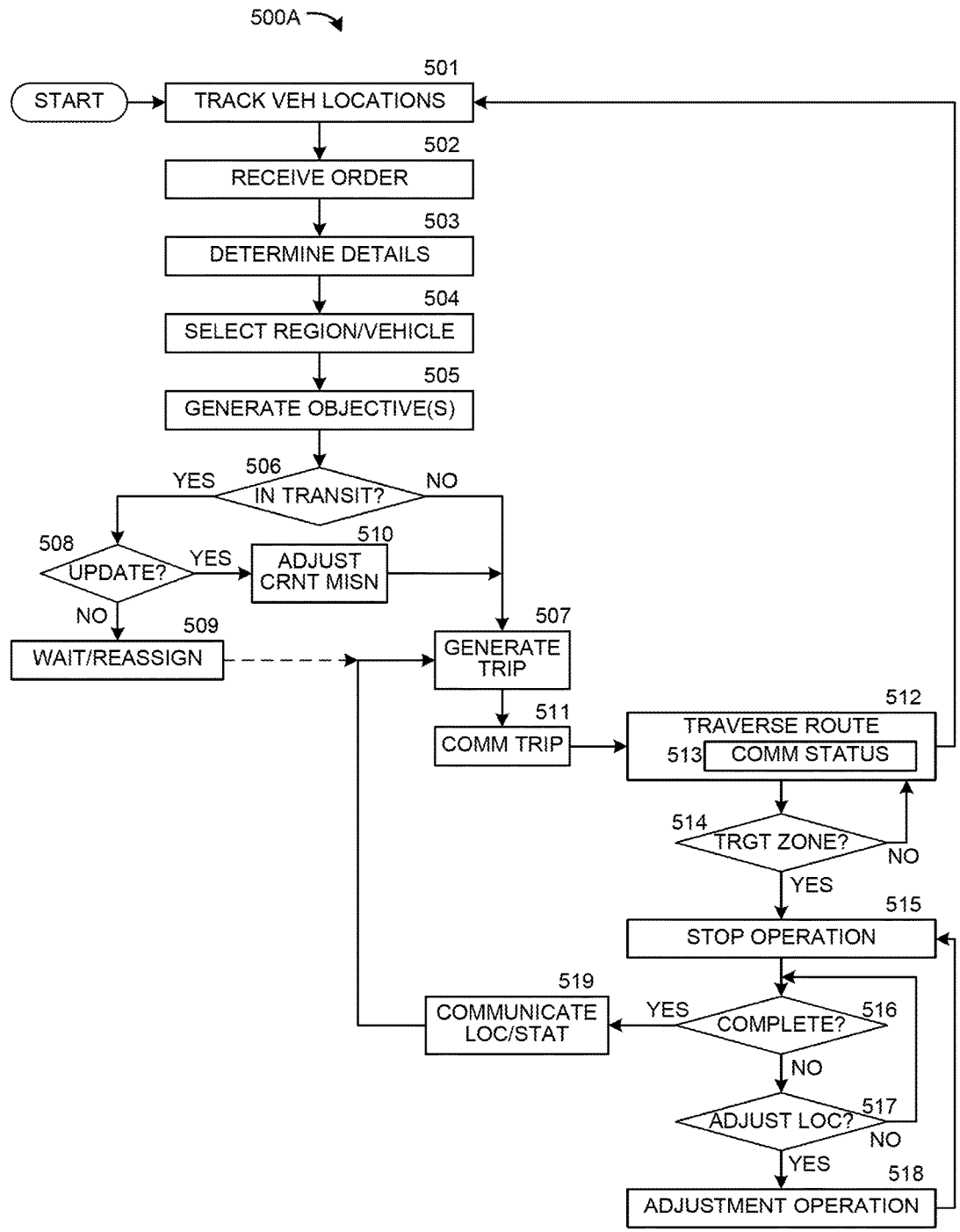
FIG. 5A and FIG. 5B are flow diagrams illustrating example processes for implementing automated deliveries using a fleet of autonomous vehicles according to some embodiments.
Figure 5B:
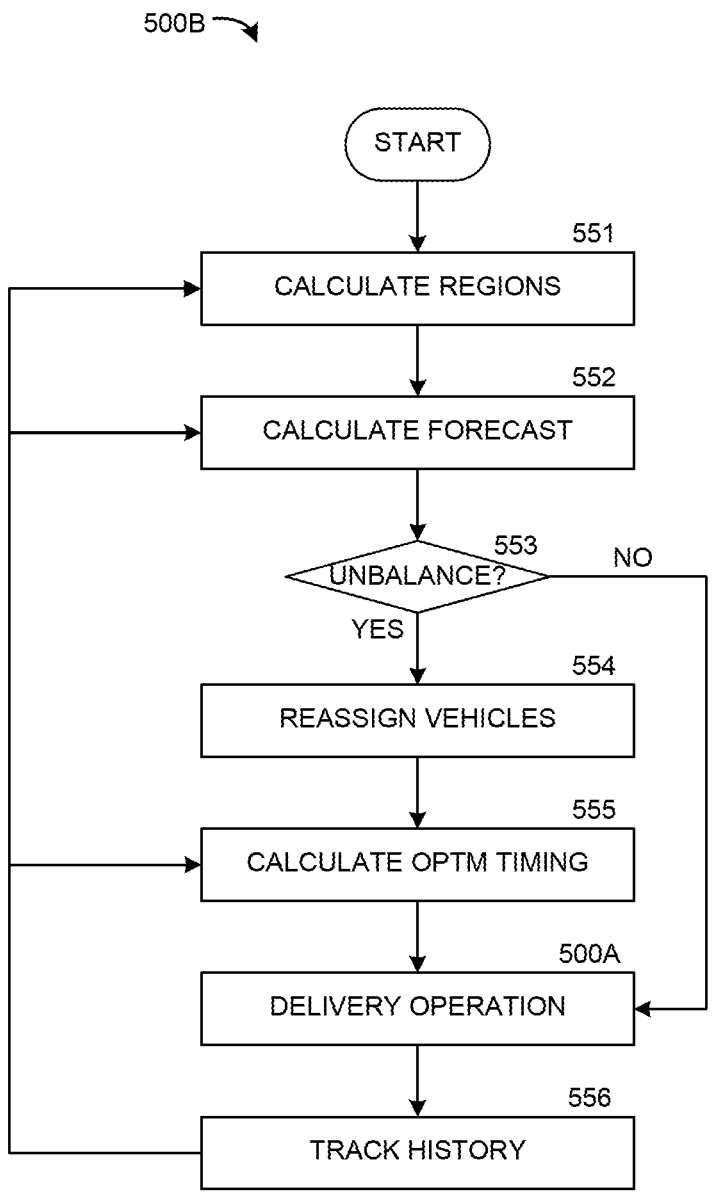

FIG. 5A and FIG. 5B are flow diagrams illustrating example processes for implementing automated deliveries using a fleet of autonomous vehicles according to some embodiments. In some embodiments, the delivery management system 100 of FIG. 1, one or more of autonomous delivery vehicles 120 of FIG. 1, or a combination thereof can implement the processes illustrated in FIG. 5A and/or FIG. 5B.

FIG. 5A illustrates an example process 500A for managing the fleet of vehicles to pick up and deliver items in response to orders according to some embodiments. Referring to FIG. 5A together with FIGS. 1-4B, at block 501, the delivery management system 100 tracks vehicle locations (e.g., the vehicle current location 214) of the fleet of autonomous delivery vehicles 120 (including the autonomous delivery vehicle 302). For example, the delivery management system 100 can receive regular (e.g., periodic and/or event-based) status updates (e.g., task status, remaining missions, trip progress, the vehicle current location 214, etc.) from the autonomous delivery vehicles 120. The delivery management system 100 can store (in e.g., memory and/or database) and update the status updates for each of the vehicles in the fleet.

At block 502, the delivery management system 100 can receive a delivery order. For example, the delivery management system 100 can receive the order detail 406 of FIG. 4A representing a request from the delivery recipient 102 for delivery of the payload 106 to a requested location. The delivery management system 100 can receive the order detail 406 directly from the delivery recipient 102, such as when the delivery management system 100 is directly connected to or integral with an order/purchasing service. Also, the delivery management system 100 can receive the order detail 406 from the merchant user 104 (e.g., a store or a restaurant providing the requested payload 106) when the delivery recipient 102 orders the requested payload 106 and requests delivery thereof.

At block 503, the delivery management system 100 can determine details associated with the delivery order. For example, the delivery management system 100 can determine various aspects of the order detail 406 from the received information. The delivery management system 100 can analyze or search the received information for the delivery/pickup location or an address/coordinates associated with the desired delivery/pickup location, a description or an identification of the requested payload 106, permission to access private property, a requested delivery time, or a combination thereof. By analyzing the information, the delivery management system 100 can identify the delivery recipient 102, the delivery/pickup location, the requested payload 106, etc. from the order detail 406.

For example, the order detail 406 can include information regarding loading the requested payload 106 and unloading the requested payload 106. In some embodiments, a requesting party (e.g., an end-user or a merchant user) can request the payload 106 to be picked up from a location associated with the requesting party and dropped off at a location associated with a receiving party (e.g., an end-user or a merchant user). In some embodiments, the requesting party can request the payload 106 to be picked up at a location associated with a providing party (e.g., an end-user or a merchant user) and then dropped off at a location associated with the requesting party. The order detail can include the party names and locations specific to the pickup and the drop off activities. In some embodiments, the delivery management system 100 can identify one or more of the parties based on the requesting user's profile (e.g., merchant or end-user), previous types of requests from the requesting party, a type of category of the requested payload 106 (e.g., a store/merchant-provided item), a party at one of the identified locations, etc.

The delivery management system 100 can also determine other details associated with the delivery order based on processing/analyzing the received information. For example, the delivery management system 100 can determine the receiver-access profile 414 of FIG. 4A corresponding to the delivery recipient 102. Also, the delivery management system 100 can calculate the delivery locations 212 based on an address specified in the order detail 406 as the desired delivery location. In some embodiments, the delivery management system 100 can calculate the delivery location 212 based on the receiver-access profile 414. In some cases, the receiver-access profile 414 can include a previously-provided permission from the delivery recipient 102 to access specific portions of recipient's private property (e.g., driveways). Accordingly, the delivery management system 100 can calculate the delivery location 212 as the permitted location of the private property.

Similarly, the delivery management system 100 can determine the pickup location (e.g., one of the pickup locations 208). In some embodiments, the delivery management system 100 can identify a set of the pickup locations 208 that correspond to the requested payload 106. For example, the delivery management system 100 can search for stores/restaurants/distribution locations that provide or have the requested payload 106. From the search results, the delivery management system 100 can determine the pickup location as the result located closest to the corresponding delivery location, located within the same delivery region as the delivery location, etc.

At block 504, the delivery management system 100 can select a delivery region and one or more of the vehicles from the fleet to deliver the requested payload 106. For example, the delivery management system 100 can select an instance of the delivery regions 204 of FIG. 2 that includes/encompasses both the pickup location and the delivery location that correspond to the requested payload 106. The delivery management system 100 can identify a location (e.g., the pickup location or the delivery location) that corresponds to the requesting user and/or a non-merchant party. The delivery management system 100 can select the region that includes the requesting user location or the non-merchant party's location. In some embodiments, the delivery management system 100 can further identify the corresponding location (e.g., the delivery location or the pickup location complementary to the first identified location) nearest to the first identified location. The delivery management system 100 can also select the region that includes the corresponding location if it is not within the same region as the first identified location.

Also, the delivery management system 100 can select one of the autonomous delivery vehicles 120 assigned to and/or located in the selected instance of the delivery regions 204. In some embodiments, the delivery management system 100 can select the vehicle located at the resting location (e.g., one of the resting locations 206) designated for, or within, the selected region. In some embodiments, the delivery management system 100 can select the vehicle based on its remaining available range, fuel level, loading capacity, or a combination thereof. In some embodiments, the delivery management system 100 can select the vehicle based on the vehicle's current location (such as for selecting the vehicle closest to the corresponding pickup location), remaining missions/tasks, restrictions on delivery time, remaining portions of the route that the vehicle is instructed/scheduled to follow, etc.

At block 505, the delivery management system 100 (or, in some embodiments, the selected vehicle instead of, or along with, the delivery management system 100) can generate one or more objectives for the vehicle (e.g., the delivery mission 408 and/or one or more tasks associated therewith, such as loading and/or unloading cargo). The delivery management system 100 can generate the delivery mission 408 (e.g., a computer-readable object representing a task) that includes data including a set of activities, such as picking up or providing access to the requested payload 106, transporting and delivering the requested payload 106 to the delivery recipient 102, etc. For example, the delivery management system 100 can determine the loading profile 412 including information associated with loading the requested payload 106 onto the selected vehicle. The delivery management system 100 can determine the loading profile 412 and the maneuver details 416 corresponding to the requested payload 106, the pickup location, etc. from a predetermined set of information for different potential payloads, different pickup locations, or a combination thereof.

In some embodiments, the delivery management system 100 can group a set of the missions (e.g., the assignment set 452) for one vehicle. The delivery management system 100 can use the optimization mechanism 142 (implementing, e.g., a linear or a non-linear optimization algorithm, a machine learning algorithm, etc.) to group the set of missions and generate the assignment set 452. The delivery management system 100 can implement or execute the optimization mechanism 142 according to the optimization timing 144. As such, the delivery management system 100 can group the orders that were received and/or outstanding since the last implementation/execution of the optimization mechanism 142.

In some embodiments, the delivery management system 100 can generate separate tasks (e.g., a task for picking up the requested payload 106 and a task for delivering the requested payload 106) within each mission. The delivery management system 100 can generate the tasks based on identifying actions (e.g., loading or unloading) associated with locations (e.g., pickup or delivery location) associated with the delivery mission. For example, using predetermined rules or processes, the delivery management system 100 can identify that loading tasks are performed at pickup locations and that unloading tasks are performed at delivery locations. Accordingly, for each mission and/or requested payload 106, the delivery management system 100 can construct a software or machine-readable data structure that corresponds to the loading task and another data structure that corresponds to the unloading task. The delivery management system 100 can link the data structures (e.g., tasks) to other related data, such as locations for the actions/tasks (e.g., the pickup location or the delivery location), parties or entities at or associated with the locations, profile and/or history information corresponding to the parties/entities, etc. Also, the delivery management system 100 can link together multiple data structures or tasks that correspond to the same item, and thus pair the complementary activities of picking up and delivering the requested payload 106.

In some embodiments, the delivery management system 100 can generate tasks for delivery missions that include multiple parties and/or multiple segments (e.g., pairings of sequential locations, and/or routes therebetween, for the mission). For example, the mission can include picking up multiple items from multiple pickup locations, and then dropping them off at the delivery location. Also, a mission or an order from a single requestor can include picking up a first item at a pickup location, dropping off the first item and also picking up a second item at a delivery location, and dropping off the second item at another location. As described above, the delivery management system 100 can generate the tasks that correspond to each of the loading or unloading activities included in the multiple party/segment mission. Due to the number of parties and/or segments, the data structures can link to a plurality of other data structures. For example, multiple loading tasks can be linked to a single unloading task, or vice versa. Also, multiple tasks, regardless of the activity type, can be linked together due to the same activity location.

At decision block 506, the delivery management system 100 can determine whether the selected vehicle is in transit or has any remaining delivery missions. If not, block 507, the delivery management system 100 can generate a delivery trip (e.g., a computer-readable object representing a set of instructions or tasks, such as the vehicle trip detail 410 or the objectives of FIG. 4B) for the selected vehicle to deliver the requested payload 106. The delivery management system 100 can generate the delivery trip based on calculating the delivery route 216 for traveling from the vehicle current location 214 or the last reported location (e.g., the stop location or the adjusted location of FIG. 4B) to the pickup location and/or to the delivery location (e.g., to the next remaining mission or task). In some embodiments, the delivery route 216 can include a route for returning to the associated resting location after delivering the final payload at the last delivery location. The delivery management system 100 can calculate the delivery route 216 according to one or more mechanisms, such as A* algorithm, Dijkstra's algorithm, Floyd-Warshall's algorithm, optimization algorithms, etc. The delivery management system 100 can further generate the delivery trip based on combining the delivery route 216 with instructions for operations/maneuvers (e.g., the loading profile 412, the maneuver detail 416, etc.) at one or more locations in the route.

In some embodiments, the delivery management system 100 can use the optimization mechanism 142 to implement one or more operations illustrated in blocks 504-507. For example, the delivery management system 100 can use an optimization engine that considers the ordered item or a type thereof, pickup and/or delivery locations, corresponding regions, currently available vehicles in the region, status (e.g., current location, available range, remaining cargo space, loaded cargo items, time restriction or condition, such as hot/cold delivery, of loaded cargo items, etc.) of the available vehicles, potential sequences and/or routes for delivering the received orders and/or outstanding tasks, any impact/result (e.g., change in delivery time and/or condition of the loaded cargo) of the potential sequences and/or routes, etc. as discussed above. In some embodiments, the delivery management system 100 can use the optimization mechanism 142 to update the current ongoing task/mission of a vehicle according to the optimization mechanism 142. For example, when the vehicle is in transit as determined at block 506, at decision block 508, the optimization mechanism 142 can calculate and consider whether adjusting the current ongoing task/mission of a vehicle provides a satisfactory solution. The satisfactory solution can include a solution that corresponds to lowest score or cost among solutions and/or a score/cost within a threshold range, satisfies all or the most amount of conditions, etc.

If adjusting the task/mission/sequence thereof does not correspond to the optimization result, the delivery management system 100 can keep the task/mission to the originally assigned vehicle according to the optimal solution (e.g., system-determined optimal solution) as illustrated in block 509. For example, the delivery management system 100 can assign the task/mission to another vehicle assigned to the same region or wait until the vehicle completes the current-ongoing task/mission to assign the task/mission.

If adjusting the task/mission/sequence thereof does correspond to the optimization result, the delivery management system 100 can adjust the current ongoing mission as illustrated in block 510. For example, the delivery management system 100 can generate the optimal solution that includes a sequence, a route destination, a route, an instruction (such as, e.g., regarding loading or unloading), or a combination thereof that is different from the previous solution. In such cases, at block 507, the delivery management system 100 can generate the trip (e.g., new task/mission and/or details, destination, route, etc., that correspond to the new task/mission) that can replace the current ongoing trip.

At block 511, for some embodiments, the delivery management system 100 can communicate the trip (e.g., the delivery mission 408 and/or vehicle trip detail 410, one of the objectivse of FIG. 4B, or a combination thereof) to the selected vehicle. The delivery management system 100 can communicate the trip information for operating the autonomous delivery vehicle 302 to traverse the delivery route 216 in transporting the requested payload 106. The trip information can be communicated over the network 130 of FIG. 1. In some embodiments, the delivery management system 100 can be integral (e.g., as part of distributed computing system) with the autonomous delivery vehicles, and the trip information can be shared between the integrated components. In some embodiments, the delivery management system 100 can communicate other information discussed above to the selected vehicle and the vehicle can generate the vehicle trip detail 410. In some embodiments, the delivery management system 100 can further communicate the loading profile 412 (e.g., merchant-facing information for loading the information, such as compartment assignment, a loading sequence, a set of corresponding device instructions, etc.).

At block 512, the selected vehicle receives the trip information and implements the task/mission by traversing the delivery route 216 (e.g., the first route 464 of FIG. 4 or the second route 484). In some embodiments, the vehicle can generate the route based on the received information (e.g., destination information) and then traverse the route. In some embodiments, the autonomous delivery vehicle 302 can traverse the delivery route 216 based on some operating assistance from a remote operating center/remote operator. At block 513, the autonomous delivery vehicle 302 can report status information (e.g., current location, available fuel/range, cargo conditions, road/weather/traffic conditions, etc.) to the delivery management system 100 while traversing the route and/or executing the instructions for the objective.

As the vehicle travels, the autonomous delivery vehicle 302 and/or the delivery management system 100 can evaluate the vehicle's location relative to the target location (e.g. the delivery location, such as the first target location 455 of FIG. 4 or the second target location 457 of FIG. 4) and/or the target zone (e.g., the first target zone 466 of FIG. 4 or the second target zone 486 of FIG. 4). For example, at decision block 514, the autonomous delivery vehicle 302 can determine whether it has entered the target zone. If the vehicle has not entered the target zone, the flow can pass back block 512 and the vehicle can continue to traverse the route.

If the vehicle has entered the target zone, at block 515, the autonomous delivery vehicle 302 can implement a stopping operation. For example, the stopping operation can include instructions/processes for determining the stop location (e.g., the first stop location 472, the second stop location 492, the updated location 493, etc. as illustrated in FIG. 4B), performing maneuvers to stop at the determined stop location, notifying the recipient of the stop location, or a combination thereof. In some embodiments, the vehicle/system can implement one or more mechanisms (e.g., emergency or non-emergency pull-over/stop location identification algorithm, parking slot identification algorithm, etc.) to determine the stop location that is within the target zone and away from the flow of traffic, that is safe for recipient access, that minimizes (e.g., lowest impact or impact score satisfying one or more thresholds) impact on traffic, or a combination thereof. In some embodiments, the vehicle can analyze/access designated locations (e.g., designated loading zones, recipient/merchant-granted parking locations, etc.) before analyzing potential stop locations. In some embodiments, the autonomous delivery vehicle 302 can maneuver and/or orient itself at the stop according to the maneuver detail 416 to perform the task.

Once the vehicle has stopped at the stop location, the vehicle can determine whether the objective at the target location has been completed as illustrated at block 516. For example, the autonomous delivery vehicle 302 can use the cargo system 306 of FIG. 3 to determine whether the requested payload 106 of FIG. 1 has been loaded or unloaded. For example, the vehicle can make this determination such as based on the information from one or more sensors (e.g., weight or object sensor, compartment door latch, etc.) and/or interface information (based on e.g., interfacing with the merchant user 104/the delivery recipient 102 or their devices) on the vehicle. Accordingly, the autonomous delivery vehicle 302 can implement operations according to the loading profile 412, the maneuver detail 416, delivery pickup instructions, etc. to complete the task based on a cue (e.g., an input from the merchant/recipient or their device).

Also, while the vehicle is stopped, the vehicle can assess its surroundings to determine whether to adjust the stop location as illustrated at block 517. The autonomous delivery vehicle 302 (or using the delivery management system 100 alone or in combination with the vehicle in some embodiments) can analyze the information from the vehicle sensor(s) along with the stop location to determine whether it needs to move to a new stop location. For example, using the vehicle sensor information, the autonomous delivery vehicle 302 can identify a number of vehicles on the road that are stopped behind the delivery vehicle, honking sounds, etc. and/or whether the stop location is authorized for legally parking a vehicle. If relocation is not necessary, the flow can pass back to block 516 until the requested payload 106 has been loaded/unloaded. If relocation is necessary, the flow can pass to block 518, and the vehicle can perform the necessary maneuvers to move away from the stop location. In some embodiments, the vehicle can traverse the remaining portion of route after moving away. In some embodiments, the vehicle can calculate and traverse a circling route within the target zone. As the vehicle resumes travel, the flow can pass to block 515, and the vehicle can recalculate a new stop location (e.g., the updated location 493).

The process described in blocks 515-518 can continue until the assigned objective is complete based on a determination at decision block 516. When the objective is complete, such as when the requested payload 106 has been loaded at a pickup location or unloaded at a delivery location, the autonomous delivery vehicle 302 can communicate its location (e.g., the final stop location where the objective was completed) and/or status (e.g., vehicle range, remaining fuel, cargo status, the objective status of FIG. 4, etc.) to the delivery management system 100 as illustrated in block 519.

In some embodiments, the cargo system 306 can open or allow access to a compartment assigned to the product/item for loading item/product at the pickup location to complete the objective. The cargo system 306 can open the compartments according to a sequence, a scanned or recognized identification information for the product/item, user/merchant interaction, such as through merchant/user device, etc. The cargo system 306 can open the compartments for placement and/or pickup of item/product for delivery at the delivery locations 212. In some embodiments, when the compartment assignment is controlled by the merchant user 104 or the merchant interface mechanism 114, the assignment information can be sent to the delivery management system 100, and the system can control access to the correct compartment for the delivery recipient 102.

When the delivery management system 100 receives the final stop location and/or the status, the deliver management system 100 can generate the next trip as discuss above for block 507. For example, the deliver management system 100 can generate a new trip for completing the mission/task that is next in sequence. Also, the deliver management system 100 can calculate a new route (e.g., a new instance of the delivery route 216) going from the final stop location to the next location (e.g., the next pickup location or the next delivery location). In some instances, the delivery management system 100 can generate the new trip for returning the vehicle to the assigned location, such as to recharge/refuel or to wait for next available order.

For illustrative purposes, the delivery management system 100 is described above as generating and communicating one task/mission at a time to the vehicle. However, it is understood that the delivery management system 100 and the vehicle can operate differently. For example, the delivery management system 100 can generate a combined set of missions/tasks and the corresponding route to the vehicle at once, and the vehicle can operate according to the combined set of missions/tasks. Also for example, the delivery management system 100 can communicate a sequence of objectives (e.g., the targeted stop locations), and the vehicle can calculate the routes.

Also for illustrative purposes, the delivery management system 100 and the vehicles are described in the context of picking up an order form a merchant and delivering it to an end-user (e.g., the deliver recipient 102). However, it is understood that the delivery management system 100, the vehicles, and the processes illustrated above can be used to pick up an item from an end-user and deliver it to a merchant user or another end-user. For example, the task/mission can be to pick up a return merchandise and drop it off at a postal service or a merchant, pick up items (e.g., clothes for dry-cleaning) that need to be serviced and drop it off at a service provider, or a combination thereof.

FIG. 5B illustrates an example process 500B for managing the fleet of vehicles over a geographical area. In some embodiments, the process 500B can be implemented by the delivery management system 100 of FIG. 1. The delivery management system 100 can manage the fleet over the geographical area by dividing the geographical area in to regions, assigning the vehicles to the regions, calculating demand forecasts and adjusting vehicle location accordingly, operating the vehicles to deliver to meet real-time orders, updating forecasts and/or regions accordingly, or a combination thereof. For example, at block 551, the delivery management system 100 can calculate regions into which the geographical area is divided. The delivery management system 100 can calculate the delivery regions 204 of FIG. 2 based on calculating a size, a location, a shape, corresponding boundaries, or a combination thereof for the delivery regions 204. In some embodiments, the delivery management system 100 can calculate the regions based on linear and/or non-linear optimization mechanisms, one or more search mechanism (e.g., RRTs, A*, D*, etc.), machine learning mechanisms (e.g., DNNs, decision trees, etc.), or a combination thereof. The delivery management system 100 can calculate the regions to each include one or more potential pickup locations.

At block 552, the delivery management system 100 can calculate a demand forecast associated with one or more of the calculated regions. For example, the delivery management system 100 can calculate the demand forecast 402 of FIG. 4A for the delivery regions 204 by analyzing historical data (e.g., past orders), current ongoing demands in other areas previously determined to be analogous to the analyzed area (e.g., other similar metropolitan areas, different time zones, etc.), or a combination thereof. The delivery management system 100 can further calculate a number of autonomous vehicles for each of the regions according to the demand forecast 402 (e.g., according to an estimate of upcoming orders to deliver items for the geographic region). For example, the delivery management system 100 can increase the number of vehicles in residential areas and decrease the number of vehicles in commercial areas after work hours to account for a shift in location of potential delivery recipients.

At decision block 553, the delivery management system 100 can compare the current assigned number of vehicles and/or locations of the vehicles to the demand forecast 402. When the current assigned number of vehicles and/or locations of the vehicles are within a threshold range from the demand forecast 402 (e.g., the estimated number of vehicles needed), the delivery management system 100 can continue to conduct the delivery operation 500A with the assigned vehicles.

When the current assigned number of vehicles and/or locations of the vehicles are below or above the demand forecast 402 or outside a threshold range from the forecast, the delivery management system 100 can reassign the vehicles according to the demand forecast 402. For example, the delivery management system 100 can generate and communicate the zone-assignment adjustment 404 of FIG. 4 to one or more automated delivery vehicles in the fleet. The corresponding delivery vehicles can relocate/move according to the zone-assignment adjustment 404. After reassignment, the delivery management system 100 can calculate the optimization timing 144 of FIG. 1, as illustrated in block 555. The delivery management system 100 can control a timing or a frequency in implementing the optimization mechanism 142 of FIG. 1. If the optimization mechanism 142 is constantly running or implemented too frequently, the objectives may change too rapidly and interfere with overall efficiency of the system. As such, the delivery management system 100 can calculate the optimization timing 144 to remove hysteresis, decision noise, or delays associated with frequent decision changes. In some embodiments, the delivery management system 100 can calculate the optimization timing 144 using another optimization mechanism, such as a linear or non-linear optimization algorithm, machine learning algorithm (e.g., predictive algorithm, support vector machine (SVM), or regression), etc. The delivery management system 100 can use historical information (e.g., user feedback, execution times, number of maneuvers, etc. for past orders/deliveries) to calculate the optimization timing 144. As a result, during the delivery operation 500A, the delivery management system 100 can implement the optimization mechanism 142 according to the optimization timing 144.

At block 556, the delivery management system 100 can store and track the operational details. For example, the delivery management system 100 can store and track the orders (e.g., the order detail 406 of FIG. 4), the delivery/execution time, traffic flow rate, feedback from delivery recipients and/or merchant users, or a combination thereof. At block 556, the delivery management system 100 can also evaluate the historical information (e.g., the number and time of the orders, the delivery/execution time, traffic flow rate, user ratings, or a combination thereof). The historical information can be used as feedback/input for other operations/process. For example, the historical information can be used for calculating the optimization timing as discussed for block 555. Similarly, the historical information can be used to calculate the forecast as discussed for block 552 and/or to calculate the regions as discussed for block 551.

The delivery management system 100 can evaluate the historical information (e.g., a number or a frequency of reassignments) to determine whether to recalculate or adjust the demand forecasts or to recalculate or adjust the regions. In some embodiments, the delivery management system 100 can run one or more corresponding optimization routines/engines (e.g., predictive algorithm, SVM, regression, optimization algorithm, etc.) for the regions, the forecast, the timing, etc. at designated timing/intervals.

Dividing an area into the delivery regions 204, selecting one of the delivery regions 204 that includes both a pickup location and a delivery location that correspond to a particular order, and generating missions/tasks/routes to be implemented with the autonomous delivery vehicle 302 fulfills a pressing need to fulfil on-demand and high volume delivery that has emerged with the rapid growth of e-commerce. Local businesses require a competitive solution to address neighborhood deliveries that are frequent, timely and secure. The delivery management system 100 and/or the autonomous delivery vehicle 302 as discussed above can meet the rising demand on the logistics industry in association with increasing transportation bandwidth needs of an already fragmented industry and operational structure. The methods 500A and 500B can utilize autonomous vehicles and associated systems that aim to utilize the unit level autonomous capabilities of self-driving vehicles and fleet level autonomous mission control to help alleviate many of these challenges, and fulfil other type of specialized requirements such as neighborhood deliveries. Further, the methods 500A and 500B can combine three primary systems or system components that are required to implement such an operation in the field: vehicle autonomy (e.g., the autonomous delivery vehicle 302), logistics Internet of Things (IoT) and cloud-based fleet management (e.g., for the cargo system 306, merchant device, end-user device, or a combination thereof), tele-operations, and planning (e.g., the delivery management system 100)

Suitable System.

FIG. 6A and FIG. 6B are block diagram illustrating a delivery management system according to some embodiments. In some embodiments, the delivery management system (e.g., the delivery management system 100 of FIG. 1) includes several components and/or subsystems for managing a fleet of the autonomous delivery vehicles 120 of FIG. 1 to deliver orders across in a geographic region. In some embodiments, the delivery management system can include the autonomous delivery vehicles 120. Aspects of the system may be practiced on one or more devices (e.g., computing devices) operated by end-users (e.g., the delivery recipient 102 of FIG. 1 and/or the merchant user 104 of FIG. 1), operated autonomously, operated by a teleoperation center, operated by third parties (e.g., entities or services assisting or performing the dynamic driving task), or a combination thereof.

FIG. 6A can illustrate an autonomous vehicle 600A (e.g., one of the autonomous delivery vehicles 120, such as the autonomous delivery vehicle 302 of FIG. 3). The autonomous vehicle 600A can include a maneuvering system 602 (e.g., a system of vehicle components configured to maneuver or physically displace the vehicle) including a propulsion mechanism (e.g., an engine or a motor), a directional mechanism (e.g., steerable wheels, a rudder, a flap, movable propulsion mounts, etc.), a deceleration mechanism (e.g., brakes, an opposing engine or motor, a flap, etc.) and other related components. For automobiles, the maneuvering system 602 can include a drive train (e.g., an engine and a transmission) a steering system directing orientation of one or more wheels, a brake system, an external indicator system (e.g., lights corresponding to the brake or a lane-change operation), other drive-by-wire system, or a combination thereof.

The autonomous vehicle 600A can operate the maneuvering system 602 using a vehicle computing circuit 604, a vehicle communication circuit 606, a set of actuators 608, or a combination thereof. The actuators 608 can include a component for physically or mechanically moving or controlling one or more components of the maneuvering system 602. In some embodiments, the actuators 608 can be integral with the maneuvering system 602. In some embodiments the actuators 608 can be a separate subsystem that is connected to the maneuvering system 602.

The vehicle computing circuit 604 (e.g., a circuit including one or more data processors, a special purpose computer, and/or an onboard server) can control the actuators 608 according to vehicle software 616 (e.g., an automated driving system and/or a driver assistance system), teleoperation commands (e.g., for facilitating teleoperation of the vehicle by the remote operator), or a combination thereof. The commands, status information, other inputs can be communicated between the vehicle and other devices using the vehicle communication circuit 606 (e.g., a circuit, such as including one or more antennas, a receiver/transmitter, a modulator/demodulator, a detector, a encoder/decoder, a modem, a gateway, a switch, etc., that enables the vehicle to communicate with other external devices).

The vehicle computing circuit 604 can execute the vehicle software 616 (e.g., computer-executable instructions) stored on a vehicle storage circuit 614 (e.g., a circuit including memory, such as volatile memory, non-volatile memory, or a combination thereof) to provide the intelligence associated with the autonomous driving system and/or the driver assistance system. The vehicle computing circuit 604 can execute the vehicle software 616 to implement the automated driving system and/or the driver assistance system corresponding to one or more program modules. The vehicle computing circuit 604 and/or the vehicle software 616 can control and communicate the delivery-related hardware, such as the cargo system (e.g., for moving payloads, opening/closing compartments, cooling/heating content, etc.), the user interface, etc.

In implementing the automated driving system and/or the driver assistance system, the vehicle computing circuit 604 can autonomously generate or calculate the vehicle processing results (e.g., self-generated paths, upcoming maneuvers, and/or the corresponding set points) and control the actuators 608 accordingly. The vehicle computing circuit 604 can utilize current maneuvering parameters to generate or calculate the vehicle processing results.

For example, the vehicle computing circuit 604 can utilize sensor data generated by a sensor circuit 610 (e.g., a circuit including components such as a radar, a LIDAR, an inertial motion unit (IMU), an encoder, an ultrasonic sensor, a proximity sensor, a camera, a lane sensor, or a self-reporting/detecting circuitry for errors and/or set points in components or subsystems, etc.) in autonomously operating the vehicle. Also for example, the vehicle computing circuit 604 can similarly utilize a vehicle location (e.g., the vehicle current location 214 of FIG. 2) calculated by a location circuit 612 (e.g., a GPS positioning unit). In some embodiments, the location circuit 612 can be integral with the sensor circuit 610. In some embodiments, the vehicle computing circuit 604 can calculate the vehicle location using a dead-reckoning programming module, a WiFi-based locating module, the location circuit 612 (e.g., a GPS module), or a combination thereof.

FIG. 6B can illustrate a device 600B (e.g., the user device 112 of FIG. 1, the merchant interface mechanism 114 of FIG. 1, etc.). The device 600B can include a communication circuit 646 (e.g., a circuit, such as including one or more antennas, a receiver/transmitter, a modulator/demodulator, a detector, a encoder/decoder, a modem, etc., that enables the vehicle to communicate with other external devices) that communicates information with other devices (e.g., the autonomous vehicle 600A, the user device 112, the merchant interface mechanism 114, the Internet, etc.).

A computing circuit 644 (e.g., a circuit including one or more data processors, a special purpose computer, and/or one or more of the servers) at the device 600B can interact with a user interface circuit 650 (e.g., a circuit configured to interact with a human user/operator). The user interface circuit 650 can include a variety of input/output devices or components, such as a display or other visual indicators, a speaker, a haptic feedback generator, a touchscreen, a keyboard, a mouse, or a combination thereof. The computing circuit 644 can execute a software 656 (e.g., computer-executable instructions) stored on a storage circuit 654 (e.g., a circuit including memory, such as volatile memory, non-volatile memory, or a combination thereof) to provide the intelligence associated with the device 600B or the devices therein. The computing circuit 644 can execute the software 656 to implement the teleoperation process.

The various circuits, components, devices, and subsystems can be operably coupled to each other using a variety of mechanisms. For example, the circuits, components, devices, and subsystems can be electrically coupled to each other through wires, wireless connections, buses, etc. Also for example, the circuits, components, devices, and subsystems can be further coupled through communication protocols, operational flow or process, or a combination thereof.

Conclusion

The above Detailed Description of examples of the disclosed technology is not intended to be exhaustive or to limit the disclosed technology to the precise form disclosed above. While specific examples for the disclosed technology are described above for illustrative purposes, various equivalent modifications are possible within the scope of the disclosed technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times. Further, any specific numbers noted herein are only examples; alternative implementations may employ differing values or ranges.

These and other changes can be made to the disclosed technology in light of the above Detailed Description. While the Detailed Description describes certain examples of the disclosed technology as well as the best mode contemplated, the disclosed technology can be practiced in many ways, no matter how detailed the above description appears in text. Details of the system may vary considerably in its specific implementation, while still being encompassed by the technology disclosed herein. As noted above, particular terminology used when describing certain features or aspects of the disclosed technology should not be taken to imply that the terminology is being redefined herein to be restricted to any specific characteristics, features, or aspects of the disclosed technology with which that terminology is associated. Accordingly, the invention is not limited, except as by the appended claims. In general, the terms used in the following claims should not be construed to limit the disclosed technology to the specific examples disclosed in the specification, unless the above Detailed Description section explicitly defines such terms.

Although certain aspects of the invention are presented below in certain claim forms, the applicant contemplates the various aspects of the invention in any number of claim forms. Accordingly, the applicant reserves the right to pursue additional claims after filing this application to pursue such additional claim forms, in either this application or in a continuing application.

We claim:

1. A method of operating a system for delivering a requested payload, the method comprising:
selecting a delivery region associated with the requested payload, wherein the delivery region is selected from a set of predetermined geographic regions configured to encompass locations for dropping off ordered items;
using one or more processors:
generating a delivery task for transporting the requested payload within the selected delivery region;
calculating a delivery route corresponding to the delivery task, the delivery route for traversing through the selected delivery region to transport the requested payload to a first target location;
communicating the delivery task and the delivery route to an autonomous delivery vehicle, wherein the autonomous delivery vehicle is configured to traverse the delivery route and transport the requested payload;
receiving a stop location from the autonomous delivery vehicle, wherein the stop location represents a geographic location where the autonomous delivery vehicle stops and accomplishes the delivery task;
calculating a second route from the stop location to a second target location associated with a second task for implementation by the autonomous delivery vehicle; and
communicating the second task and the second route to the autonomous delivery vehicle in response to receiving the stop location.

2. The method of claim 1, wherein:
generating the delivery task includes determining a loading profile, wherein the loading profile includes information associated with loading the requested payload on to the autonomous delivery vehicle; and
further comprising:
communicating the loading profile to a merchant interface mechanism, wherein the merchant interface mechanism corresponds to a merchant user providing the requested payload.

3. The method of claim 1, further comprising:
receiving an order detail that represents a request to transport the requested payload to a delivery recipient; and
wherein:
selecting the delivery region includes selecting the delivery region based on the order detail.

4. The method of claim 3, further comprising:
identifying the requested payload from the order detail;
determining a delivery location based on the order detail, wherein the delivery location represents a requested geographic location for the delivery recipient to access the requested payload in the autonomous delivery vehicle;
determining a pickup location based on the requested payload and the delivery location; and
wherein:
selecting the delivery region includes selecting a delivery region including both the delivery location and the pickup location.

5. The method of claim 4, wherein communicating the delivery task and the delivery route includes communicating to an autonomous delivery vehicle assigned to the delivery region.

6. The method of claim 5, further comprising:
calculating a demand forecast representing an estimate of upcoming orders to deliver items for the geographic region; and
communicating a zone-assignment adjustment to the autonomous delivery vehicle based on the demand forecast, wherein the zone-assignment adjustment relocates and reassigns delivery vehicles to different geographic locations.

7. The method of claim 4, further comprising:
identifying the delivery recipient from the order detail;
determining a receiver-access profile corresponding to the delivery recipient, the receiver-access profile including delivery-related information associated with the delivery recipient; and
wherein:
calculating the delivery location includes calculating the delivery location based on the receiver-access profile, wherein the delivery location is associated with a geographic location for stopping the autonomous delivery vehicle away from a flow of traffic by at least a threshold distance.

8. The method of claim 7, wherein generating the delivery task includes determining maneuver details corresponding to the delivery location, wherein the maneuver details correspond to instructions for maneuvering the autonomous delivery vehicle away from the flow of traffic and stopping at the delivery location.

9. The method of claim 3, wherein the order detail represents a request from an end-user to send the requested payload to at least one of a location or a party, or to receive the requested payload from the location or the party.

10. The method of claim 1, wherein communicating the delivery task and the delivery route includes:
communicating a first objective and a first route to the first target location associated with the delivery task, wherein:
the first route includes a target zone associated with the first target location, and
the target zone represents a set of geographic locations surrounding the first target location where the autonomous delivery vehicle is authorized to stop for accomplishing the delivery task by loading or unloading the requested payload; and
further comprising:
combining the delivery task with the second task for implementation by the autonomous delivery vehicle, wherein the combining is based on analyzing a resulting change in at least one of a travel time, a travel distance, a number of maneuvers, or a type of maneuver for the autonomous delivery vehicle.

11. A delivery management system comprising:
one or more processors configured to:

select a delivery region associated with a requested payload, wherein the delivery region is selected from a set of predetermined geographic regions configured to encompass locations for dropping off ordered items, generate a delivery task for transporting the requested payload within the selected delivery region, wherein the delivery task includes a delivery route for traversing in or through the geographic region to transport the requested payload, and calculate a second route from a stop location to a second target location associated with a second task, wherein:
- the second task for implementation by the autonomous delivery vehicle, and
- the stop location represents a geographic location where the autonomous delivery vehicle stops and accomplishes the delivery task; and a communication circuit, operably coupled to the one or more processors, configured to:
- communicate the delivery task to an autonomous delivery vehicle to traverse the delivery route and transport the requested payload, and
- receive a stop location from the autonomous delivery vehicle.

12. The system of claim 11, wherein:
the one or more processors are configured to determine a loading profile that includes information associated with loading the requested payload on to the autonomous delivery vehicle; and
the communication circuit is configured to communicate the loading profile to a merchant interface mechanism, wherein the merchant interface mechanism corresponds to a merchant user providing the requested payload.

13. The system of claim 11, wherein:
the communication circuit is configured to receive an order detail that represents a request to transport the requested payload to a delivery recipient; and
the one or more processors are configured to select the delivery region based on the order detail.

14. The system of claim 13, wherein the one or more processors are configured to:
identify the requested payload from the order detail;
determine a delivery location based on the order detail, wherein the delivery location represents a requested geographic location for the delivery recipient to access to the requested payload in the autonomous delivery vehicle;
determine a pickup location based on the requested payload and the delivery location; and
select a delivery region including both the delivery location and the pickup location.

15. The system of claim 11, wherein:
the one or more processors are configured to:
generate a first objective and a first route to a first target location associated with the delivery task, wherein:
- the first route includes a target zone associated with the first target location, and
- the target zone represents a set of geographic locations surrounding the first target location where the autonomous delivery vehicle is authorized to determine and stop at the stop location for accomplishing the delivery task by loading or unloading the requested payload; and
combine the delivery task with the second task for implementation by the autonomous delivery vehicle, wherein combining is based on analyzing a resulting change in at least one of a travel time, a travel distance, a number of maneuvers, or a type of maneuver for the autonomous delivery vehicle.

16. A non-transitory computer-readable medium encoded with instructions that, when executed by one or more processors, perform a method of operating a system for delivering a requested payload, the method comprising:
selecting a delivery region associated with the requested payload, wherein the geographic region is selected from a set of predetermined geographic regions configured to encompass locations for dropping off ordered items;
generating a delivery mission for transporting the requested payload within the selected delivery region, wherein the delivery mission includes a delivery route for traversing through the selected delivery region to transport the requested payload;
communicating the delivery mission to an autonomous delivery vehicle to traverse the delivery route and transport the requested payload;
receiving a stop location from the autonomous delivery vehicle, wherein the stop location represents a geographic location within the target zone where the autonomous delivery vehicle stops and accomplishes the delivery task;
calculating a second route from the stop location to a second target location associated with a second task for implementation by the autonomous delivery vehicle; and
communicating the second task and the second route to the autonomous delivery vehicle in response to receiving the stop location.

17. The non-transitory computer-readable medium of claim 16 including the method, wherein:
generating the delivery task includes determining a loading profile, wherein the loading profile includes information associated with loading the requested payload on to the autonomous delivery vehicle; and
the method further comprising:
communicating the loading profile to a merchant interface mechanism, wherein the merchant interface mechanism corresponds to a merchant user providing the requested payload.

18. The non-transitory computer-readable medium of claim 16 including the method, the method further comprising:
receiving an order detail that represents a request to transport the requested payload to a delivery recipient; and
wherein:
selecting the delivery region includes selecting the delivery region based on the order detail.

19. The non-transitory computer-readable medium of claim 18 including the method, the method further comprising:
identifying the requested payload from the order detail;
calculating a delivery location based on the order detail, wherein the delivery location represents a requested geographic location for the delivery recipient to access the requested payload in the autonomous delivery vehicle;
determining a pickup location based on the requested payload and the delivery location; and
wherein:

selecting the delivery region includes selecting a delivery region including both the delivery location and the pickup location.

20. The non-transitory computer-readable medium of claim 16 including the method, wherein communicating the delivery task and the delivery route includes:
- communicating a first objective and a first route to a first target location associated with the delivery task, wherein:
  - the first route includes a target zone associated with the first target location, and
  - the target zone represents a set of geographic locations surrounding the first target location where the autonomous delivery vehicle is authorized to stop for accomplishing the delivery task by loading or unloading the requested payload; and
- the method further comprising:
- combining the delivery task with the second task for implementation by the autonomous delivery vehicle, wherein combining is based on analyzing a resulting change in at least one of a travel time, a travel distance, a number of maneuvers, or a type of maneuver for the autonomous delivery vehicle.

\* \* \* \* \*